(12) United States Patent
Han et al.

(10) Patent No.: US 11,930,523 B2
(45) Date of Patent: Mar. 12, 2024

(54) DATA TRANSMISSION METHOD AND TERMINAL DEVICE

(71) Applicant: Huawei Technologies Co., Ltd., Shenzhen (CN)

(72) Inventors: Yunbo Han, Shenzhen (CN); Zhiqiang Song, Chengdu (CN); Hongcheng Zhuang, Shenzhen (CN); Bingguang Peng, Shanghai (CN); Zhenguo Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 17/286,386

(22) PCT Filed: Oct. 17, 2019

(86) PCT No.: PCT/CN2019/111644
§ 371 (c)(1),
(2) Date: Apr. 16, 2021

(87) PCT Pub. No.: WO2020/078415
PCT Pub. Date: Apr. 23, 2020

(65) Prior Publication Data
US 2021/0352683 A1 Nov. 11, 2021

(30) Foreign Application Priority Data

Oct. 17, 2018 (CN) .......................... 201811210887.1
Dec. 18, 2018 (CN) .......................... 201811551314.5

(51) Int. Cl.
*H04W 72/543* (2023.01)
*H04W 72/1268* (2023.01)
*H04W 72/542* (2023.01)

(52) U.S. Cl.
CPC ..... *H04W 72/543* (2023.01); *H04W 72/1268* (2013.01); *H04W 72/542* (2023.01)

(58) Field of Classification Search
None
See application file for complete search history.

(56) References Cited

U.S. PATENT DOCUMENTS

| 9,420,540 | B2 | 8/2016 | Seo et al. |
| 11,631,368 | B2 * | 4/2023 | Wu .................... H04M 1/0266 345/55 |

(Continued)

FOREIGN PATENT DOCUMENTS

| CN | 104468060 A | 3/2015 |
| CN | 107509250 A | 12/2017 |

(Continued)

OTHER PUBLICATIONS

"Relationship between grant-free and grant-based access," 3GPP TSG-RAN WG1 #86bis, Lisbon, Portugal, R1-1609655, Total 2 pages, 3rd Generation Partnership Project, Valbonne, France (Oct. 10-14, 2016).

(Continued)

*Primary Examiner* — Gregory B Sefcheck
(74) *Attorney, Agent, or Firm* — Leydig, Voit & Mayer, Ltd.

(57) ABSTRACT

This application provides a data transmission method and a terminal device, to reduce a data transmission latency and improve data transmission reliability. The method includes: obtaining, by a terminal device, a grant-free GF resource configured by a base station; obtaining, by the terminal device, current channel quality; and if the current channel quality is first channel quality, transmitting, by the terminal device, to-be-transmitted data by using the GF resource, or transmitting, by the terminal device, the to-be-transmitted data by using a GB resource, where the first channel quality (Continued)

falls within a first range; or if the current channel quality is second channel quality, skipping, by the terminal device, transmitting to-be-transmitted data by using the GF resource, where the second channel quality falls within a second range; where the first channel quality is better than the second channel quality, and the first range is different from the second range.

12 Claims, 8 Drawing Sheets

(56) References Cited

U.S. PATENT DOCUMENTS

| | | | | |
|---|---|---|---|---|
| 2011/0216688 | A1* | 9/2011 | Katori | H04W 72/30 |
| | | | | 370/312 |
| 2012/0230305 | A1* | 9/2012 | Barbu | H04W 48/20 |
| | | | | 370/338 |
| 2015/0098353 | A1 | 4/2015 | Kang et al. | |
| 2016/0014185 | A1* | 1/2016 | Lottermann | H04W 72/542 |
| | | | | 709/219 |
| 2016/0066301 | A1* | 3/2016 | Zhu | H04W 72/542 |
| | | | | 370/329 |
| 2016/0270053 | A1 | 9/2016 | Zeng et al. | |
| 2016/0352454 | A1* | 12/2016 | Zhang | H04L 1/0003 |
| 2017/0086120 | A1* | 3/2017 | Huang | H04W 36/0022 |
| 2017/0208455 | A1* | 7/2017 | Au | H04W 8/22 |
| 2017/0367116 | A1* | 12/2017 | Li | H04W 74/004 |
| 2018/0035458 | A1* | 2/2018 | Islam | H04L 1/16 |
| 2018/0035459 | A1* | 2/2018 | Islam | H04L 5/0053 |
| 2018/0048450 | A1* | 2/2018 | Raissinia | H04L 5/0055 |
| 2018/0092125 | A1* | 3/2018 | Sun | H04W 74/02 |
| 2018/0123765 | A1* | 5/2018 | Cao | H04L 5/0055 |
| 2018/0139774 | A1* | 5/2018 | Ma | H04L 1/189 |
| 2018/0176945 | A1* | 6/2018 | Cao | H04L 5/0044 |
| 2018/0206246 | A1* | 7/2018 | Zhang | H04L 1/1896 |
| 2018/0295651 | A1* | 10/2018 | Cao | H04W 74/0833 |
| 2019/0075563 | A1* | 3/2019 | Babaei | H04L 5/0094 |
| 2019/0230689 | A1* | 7/2019 | Cao | H04L 1/08 |
| 2020/0059935 | A1* | 2/2020 | Qian | H04W 72/52 |
| 2020/0146032 | A1* | 5/2020 | Bae | H04L 1/1819 |
| 2020/0178275 | A1* | 6/2020 | Shao | H04W 72/23 |
| 2020/0275413 | A1* | 8/2020 | Zhang | H04W 36/06 |
| 2020/0314906 | A1* | 10/2020 | Goyal | H04W 74/0816 |
| 2021/0345366 | A1* | 11/2021 | Ying | H04W 72/0453 |
| 2022/0159628 | A1* | 5/2022 | Bangolae | H04W 72/04 |

FOREIGN PATENT DOCUMENTS

| | | |
|---|---|---|
| CN | 108400837 A | 8/2018 |
| CN | 108650049 A | 10/2018 |
| CN | 109699085 A | 4/2019 |
| JP | 2011142533 A | 7/2011 |
| JP | 2018511994 A | 4/2018 |
| JP | 2019522418 A | 8/2019 |
| WO | 2016148885 A1 | 9/2016 |
| WO | 2017218847 A1 | 12/2017 |
| WO | 2018090861 A1 | 5/2018 |
| WO | 2018170669 A1 | 9/2018 |

OTHER PUBLICATIONS

Qualcomm Incorporated, "Remaining Issues on Power Control for NR," 3GPP TSG RAN WG1 Meeting AH 1801, Vancouver, Canada, R1-1800884, total 9 pages, 3rd Generation Partnership Project, Valbonne, France (Jan. 22-26, 2018).

OPPO, "Text proposal for uplink power control," 3GPP TSG RAN WG1 Meeting AH 1801, Vancouver, Canada, R1-1800486, total 9 pages, 3rd Generation Partnership Project, Valbonne, France (Jan. 22-26, 2018).

Samsung, "On UL Power Control," 3GPP TSG RAN WG1 Meeting 90bis, Prague, CZ, R1-1717692, total 6 pages, 3rd Generation Partnership Project, Valbonne, France (Oct. 9-13, 2017).

* cited by examiner

DATA TRANSMISSION METHOD AND TERMINAL DEVICE

CROSS-REFERENCE TO RELATED APPLICATIONS

This application is a national stage of International Application No. PCT/CN2019/111644, filed on Oct. 17, 2019, which claims priority to Chinese Patent Application No. 201811551314.5, filed on Dec. 18, 2018, and Chinese Patent Application No. 201811210887.1, filed on Oct. 17, 2018. All of the aforementioned patent applications are hereby incorporated by reference in their entireties.

TECHNICAL FIELD

This application relates to the communications field, and in particular, to a data transmission method and a terminal device.

BACKGROUND

In an LTE system, when a terminal device needs to transmit uplink (UL) data, the terminal device may first send a scheduling request (SR) command to notify a base station that the data needs to be transmitted. After receiving the SR command, the base station sends an uplink scheduling message to the terminal device. Usually, there is a scheduling latency in a process from sending the SR command to receiving the uplink scheduling message by the terminal device, and then there is a transmission latency in a process from receiving the uplink scheduling message to transmitting the uplink data by the terminal device. In other words, there are the scheduling latency and the transmission latency in a process from sending a data transmission request to actually transmitting the uplink data by the terminal device. This uplink data transmission mode is referred to as a grant-based (also referred to as UL Transmission with grant or Scheduled Grant) transmission method, which is briefly referred to as GB transmission below.

In the 5th generation (5G) mobile communications system, a grant-free (e.g., Configured Grant, Grantless, Grantless, UL Transmission without grant, or the like) transmission method is introduced. To be specific, a base station first configures a grant-free (GF) transmission resource for a terminal device, where the GF transmission resource is a periodic resource. When the terminal device needs to perform transmission, the terminal device directly sends data on the GF transmission resource configured by the base station, and does not need to send an SR or wait for scheduling by the base station, thereby reducing a scheduling latency and a transmission latency, and reducing signaling overheads.

According to the current 5G standard, after a terminal device transmits data by using a GF transmission resource, if the terminal device does not receive a feedback sent by a base station, the terminal device considers that the base station has correctly received the data. When the terminal device sends to-be-transmitted data, if all the to-be-transmitted data sent by the terminal device is lost in a transmission process, especially when the base station does not detect any sent signal of the terminal device, the base station naturally does not feed back a data receiving status to the terminal device. However, according to the foregoing rule, the terminal device considers that the data has been successfully received by the base station, and therefore does not retransmit the data. It is clear that this reduces reliability of transmitting data by using the GF transmission resource.

SUMMARY

This application provides a data transmission method and a terminal device, to reduce a data transmission latency and improve data transmission reliability.

In view of this, according to a first aspect, this application provides a data transmission method, including:
  obtaining, by a terminal device, a grant-free (GF) resource configured by a base station; obtaining, by the terminal device, a current channel quality; and if the current channel quality is a first channel quality, transmitting, by the terminal device, to-be-transmitted data by using the GF resource, or transmitting, by the terminal device, the to-be-transmitted data by using a grant-based (GB) resource, where the first channel quality falls within a first range; or if the current channel quality is a second channel quality, skipping, by the terminal device, transmitting the to-be-transmitted data by using the GF resource, where the second channel quality falls within a second range; where the first channel quality is better than the second channel quality, and the first range is different from the second range.

In this embodiment of this application, the base station configures the GF resource for the terminal device, and the GF resource may be used for GF transmission. The GF resource may include a channel that can be used for transmission, a channel parameter, and the like. After detecting the current channel quality, the terminal device may compare the current channel quality with the preset first range and the preset second range. If the current channel quality is the first channel quality, that is, the current channel quality falls within the first range, the terminal device may transmit the to-be-transmitted data by using the GF resource, or the terminal device may transmit the to-be-transmitted data by using the GB resource. If the current channel quality is the second channel quality, that is, the current channel quality falls within the second range, the terminal device does not transmit the to-be-transmitted data by using the GF resource. In addition, the first channel quality is better than the second channel quality. Therefore, when determining that the current channel quality is relatively good, the terminal device may perform transmission by using the GF resource in this case, so that transmission is relatively stable, and a data loss does not easily occur. When determining that the current channel quality is relatively poor, the terminal device may not perform transmission by using the GF resource in this case, to avoid a data loss. Therefore, in this embodiment of this application, the current channel quality is determined, to determine whether the to-be-transmitted data can be transmitted by using the GF resource, so that reliability of transmitting the data by using the GF resource can be improved.

In an optional implementation of this application, before the transmitting, by the terminal device, the to-be-transmitted data by using a GB resource, the method may further include:
  receiving, by the terminal device, the GB resource configured by the base station.

In this embodiment of this application, if the terminal device transmits the to-be-transmitted data by using the GB resource, the terminal device may further receive the GB resource configured by the base station, to transmit the to-be-transmitted data.

In an optional implementation of this application, a parameter related to the current channel quality may include: at least one of a reference signal received power (RSRP), reference signal received quality RSRQ, a reference signal carrier-to-interference-and-noise ratio (RS-CINR), or a path loss (PL) of a channel.

In this embodiment of this application, channel quality of a current channel may be measured by using the RSRP, the RSRQ, the RS-CINR, and the PL, so that the current channel quality can better reflect the channel quality of the current channel, the channel quality of the current channel is more accurately determined, and the to-be-transmitted data is more reliably transmitted by using the GF resource.

In an optional implementation of this application, the first channel quality meets at least one of the following:
the RSRP is greater than a first threshold, the RSRQ is greater than a second threshold, the RS-CINR is greater than a third threshold, or the PL is less than a fourth threshold; and
the second channel quality meets at least one of the following: the RSRP is less than the first threshold, the RSRQ is less than the second threshold, the RS-CINR is less than the third threshold, or the PL is greater than the fourth threshold.

In this embodiment of this application, parameters related to the first channel quality and the second channel quality may include one or more of the RSRP, the RSRQ, the RS-CINR, and the PL, and the first channel quality and the second channel quality each include the parameter corresponding to the current channel quality. For example, if the parameter related to the current channel quality is the RSRP, the first channel quality meets that the RSRP is greater than the first threshold, and the second channel quality meets that the RSRP is less than the first threshold. Therefore, in this embodiment of this application, the current channel quality may be determined, and the channel quality of the current channel is measured by using the RSRP, the RSRQ, the RS-CINR, and the PL, so that determining for the channel quality of the current channel is more accurate, and the to-be-transmitted data is more reliably transmitted by using the GF resource.

In an optional implementation of this application, if the parameter related to the current channel quality includes the RSRP, the first range includes that the RSRP is greater than the first threshold, and the second range includes that the RSRP is less than the first threshold; or if the parameter related to the current channel quality includes the RSRQ, the first range includes that the RSRQ is greater than the second threshold, and the second range includes that the RSRQ is less than the second threshold; or if the parameter related to the current channel quality includes the RS-CINR, the first range includes that the RS-CINR is greater than the third threshold, and the second range includes that the RS-CINR is less than the third threshold; or if the parameter related to the current channel quality includes the PL, the first range includes that the PL is less than the fourth threshold, and the second range includes that the PL is greater than the fourth threshold.

In an optional implementation of this application, if the parameter related to the current channel quality includes the RSRP, an RSRP of the first channel quality is greater than the first threshold, and an RSRP of the second channel quality is less than the first threshold; or if the parameter related to the current channel quality includes the RSRQ, RSRQ of the first channel quality is greater than the second threshold, and RSRQ of the second channel quality is less than the second threshold; or if the parameter related to the current channel quality includes the RS-CINR, an RS-CINR of the first channel quality is greater than the third threshold, and an RS-CINR of the second channel quality is less than the third threshold; or if the parameter related to the current channel quality includes the PL, a PL of the first channel quality is less than the fourth threshold, and a PL of the second channel quality is greater than the fourth threshold.

In an optional implementation of this application, the obtaining, by a terminal device, a grant-free GF resource configured by a base station may include: receiving, by the terminal device, GF configuration information sent by the base station. In addition, the method may further include: performing, by the terminal device, calculation based on the GF configuration information, to determine the first range and the second range.

In this embodiment of this application, the terminal device may determine, by sending the GF configuration information by the base station, the GF resource configured by the base station. In addition, the terminal device may further determine the first range and the second range by using the GF configuration information. For example, the terminal device may calculate, based on the GF configuration information, one or more of a plurality of thresholds such as the first threshold corresponding to the RSRP, the second threshold corresponding to the RSRQ, the third threshold corresponding to the RS-CINR, and the fourth threshold corresponding to the PL. After the one or more thresholds are determined, the first range and/or the second range may be actually determined. For example, after it is determined that the first range is that the RSRP is greater than the first threshold, when the first range and the second range are exactly opposite, it is actually determined that the second range includes that the RSRP is less than the first threshold. In this way, the terminal device more accurately classifies the current channel quality, and more reliably transmits the to-be-transmitted data by using the GF resource.

In an optional implementation of this application, if the first range includes that the RSRP is greater than the first threshold, and the second range includes that the RSRP is less than the first threshold, the performing, by the terminal device, calculation based on the GF configuration information, to determine the first range and the second range may include:
performing, by the terminal device, calculation according to a first preset formula based on a maximum transmit power, $P_{CMAX}$, of the terminal device, a reference transmit power, $P_{T,RS}$, of a downlink signal, and the GF configuration information, to obtain the first threshold.

In an optional implementation of this application, the first preset formula includes:

$$\text{RSRP\_thr} = P_{T,RS} - \frac{P_{CMAX} - P_O - 10 * \lg(2^\mu * M) - \Delta - f}{\alpha} - \text{delta\_RSRP},$$

where
RSRP_thr is the first threshold, $P_O$ is a receive power of the downlink signal, $\alpha$ is a path loss impact factor, $\mu$ is a subcarrier spacing indicator, M is an uplink transmission resource size, $\Delta$ is a preset parameter, f is a dynamic power control parameter, delta_RSRP is a preset parameter, and delta_RSRP>=0.

In an optional implementation of this application, if the parameter related to the current channel quality includes the RSRP, the obtaining, by the terminal device, current channel quality may include:

measuring, by the terminal device, the downlink signal to obtain a value of the RSRP. The downlink signal may be a downlink reference signal periodically sent by the base station, or may be a downlink data signal, a downlink control signal, or the like sent by the base station.

In this embodiment of this application, the terminal device may directly measure the downlink signal sent by the base station, to obtain the value of the RSRP. The value of the RSRP may be used to measure the current channel quality, and is used to subsequently determine whether to transmit the to-be-transmitted data by using the GF resource, so that the terminal device more reliably transmits the to-be-transmitted data by using the GF resource.

In an optional implementation of this application, if the parameter related to the channel quality includes the RSRQ, the obtaining, by the terminal device, current channel quality may include:

measuring, by the terminal device, the downlink signal to obtain the value of the RSRP, where the downlink signal may be the downlink reference signal periodically sent by the base station, or may be the downlink data signal, the downlink control signal, or the like sent by the base station; and detecting, by the terminal device, a signal in receive bandwidth, to obtain a value of a reference signal strength indicator RSSI; and performing, by the terminal device, calculation based on the value of the RSRP and the value of the RSSI according to a second preset formula, to obtain a value of the RSRQ, where the second preset formula includes: RSRQ=N*RSRP/RSSI, and N is a quantity of subcarriers in the receive bandwidth.

In this embodiment of this application, the terminal device may measure the RSRP of the downlink signal and the RSSI of the receive bandwidth, to calculate the value of the RSRQ. The value of the RSRQ may be used to measure the channel quality of the current channel, and is used to subsequently determine whether to transmit the to-be-transmitted data by using the GF resource, so that the terminal device more reliably transmits the to-be-transmitted data by using the GF resource.

In an optional implementation of this application, if the parameter related to the channel quality includes the RS-CINR, the obtaining, by the terminal device, current channel quality may include:

measuring, by the terminal device, the downlink signal to obtain the value of the RSRP; detecting, by the terminal device, the signal in the receive bandwidth, to obtain the value of the reference signal strength indicator RS SI; and performing, by the terminal device, calculation based on the RSRP and the RS SI according to a third preset formula, to obtain the value of the RSRQ, where the third preset formula includes: RS-CINR=N*RSRP/(RSSI−N*RSRP), and N is the quantity of subcarriers in the receive bandwidth.

In this embodiment of this application, the terminal device may measure the RSRP of the downlink signal and the RSSI of the receive bandwidth, to calculate a value of a subsequent RS-CINR. The value of the RS-CINR may be used by the terminal device to measure the channel quality of the current channel, and is used to subsequently determine whether to transmit the to-be-transmitted data by using the GF resource. When the value of the RS-CINR is greater than the third threshold, data transmission is relatively stable in this case, and transmission may be performed by using the GF resource, so that the terminal device more reliably transmits the to-be-transmitted data by using the GF resource.

In an optional implementation of this application, if the parameter related to the channel quality includes the PL, the obtaining, by the terminal device, current channel quality may include:

obtaining, by the terminal device, a value of the reference transmit signal power $P_{T,RS}$ of the downlink signal; measuring, by the terminal device, a value of a receive power $P_{R,RS}$ of the downlink signal; and performing, by the terminal device, calculation based on $P_{T,RS}$ and $P_{R,RS}$ according to a fourth preset formula, to obtain a value of the PL, where the fourth preset formula includes: $P_L=P_{T,RS}-P_{R,RS}$.

In this embodiment of this application, the value of the $P_L$, namely, a power lost during transmission of the downlink signal, may be calculated by using obtained $P_{T,RS}$ and $P_{R,RS}$ obtained by the terminal device through measurement, and the channel quality of the current channel is measured by using the value of the PL. When the value of the PL is less than the fourth threshold, the power lost during transmission of the downlink signal is relatively low, and the channel quality is relatively good. In this case, the GF resource may be selected to transmit the to-be-transmitted data.

In an optional implementation of this application, the method may further include:

if the current channel quality is the second channel quality, transmitting, by the terminal device, the to-be-transmitted data by using the grant-based GB resource.

In this embodiment of this application, if the current channel quality is the second channel quality, it may be understood that the current channel quality is relatively poor. In this case, the terminal device may request the base station to schedule the GB resource, and transmit the to-be-transmitted data by using the GB resource, to avoid a loss of the to-be-transmitted data in a transmission process, and improve data transmission reliability.

In an optional implementation of this application, the method may further include:

if the current channel quality is the second channel quality, obtaining, by the terminal device, updated channel quality within preset duration; and if the updated channel quality is the first channel quality, transmitting, by the terminal device, the to-be-transmitted data by using the GF resource.

In this embodiment of this application, if the current channel quality is the second channel quality, the terminal device may determine that the current channel quality is relatively poor, and the terminal device may continuously monitor the current channel quality. If the updated channel quality is the first channel quality within the preset duration, the terminal device may determine that the current channel quality is relatively good, and may transmit the to-be-transmitted data by using the GF resource, so that the to-be-transmitted data can be transmitted by using a stable GF resource, to improve data transmission stability.

In an optional implementation of this application, before the obtaining, by the terminal device, current channel quality, the method further includes:

obtaining, by the terminal device, a service corresponding to the to-be-transmitted data; and if the terminal device determines that the service is not in a preset list, transmitting, by the terminal device, the to-be-transmitted data by using the GF resource; or if the terminal device determines that the service is in the preset list, performing, by the terminal device, the step of obtaining current channel quality.

In this embodiment of this application, the terminal device may determine whether the service corresponding to the to-be-transmitted data is in the preset list, where the preset list may be understood as a whitelist. If the service is not in the preset list, the terminal device may directly transmit the to-be-transmitted data by using the GB resource. If the service is in the preset list, the terminal device may perform the step of obtaining current channel quality. Therefore, for a service that has a relatively high latency and reliability requirement, the steps of obtaining current channel quality and subsequent determining may be performed. For a service that has a low latency or reliability requirement, transmission may be directly performed by using the GB resource, or transmission may be directly performed by using the GF resource without determining. Therefore, in this embodiment of this application, reliability of transmitting data of the service that has the relatively high latency and reliability requirement can be improved, and a data transmission latency can be reduced by transmitting the data by using the GF resource.

According to a second aspect, this application provides a terminal device, including:

a transceiver unit, configured to obtain a grant-free GF resource configured by a base station; and a processing unit, configured to obtain current channel quality, where the transceiver unit is further configured to: if the current channel quality is first channel quality, transmit to-be-transmitted data by using the GF resource, or transmit the to-be-transmitted data by using a GB resource, where the first channel quality falls within a first range; or the transceiver unit is further configured to: if the current channel quality is second channel quality, skip transmitting to-be-transmitted data by using the GF resource, where the second channel quality falls within a second range; and the first channel quality is better than the second channel quality, and the first range is different from the second range.

In an optional implementation of this application, the transceiver unit is further configured to:

before the transceiver unit transmits the to-be-transmitted data by using the GB resource, receive the GB resource configured by the base station.

In an optional implementation of this application, a parameter related to the current channel quality includes:

at least one of a reference signal received power RSRP, reference signal received quality RSRQ, a reference signal carrier-to-interference-and-noise ratio RS-CINR, or a path loss PL of a channel.

In an optional implementation of this application, the first channel quality meets at least one of the following:

the RSRP is greater than a first threshold, the RSRQ is greater than a second threshold, the RS-CINR is greater than a third threshold, or the $P_L$ is less than a fourth threshold; and the second channel quality meets at least one of the following: the RSRP is less than the first threshold, the RSRQ is less than the second threshold, the RS-CINR is less than the third threshold, or the $P_L$ is greater than the fourth threshold.

In an optional implementation of this application:

if the parameter related to the current channel quality includes the RSRP, the first range includes that the RSRP is greater than the first threshold, and the second range includes that the RSRP is less than the first threshold; or if the parameter related to the current channel quality includes the RSRQ, the first range includes that the RSRQ is greater than the second threshold, and the second range includes that the RSRQ is less than the second threshold; or if the parameter related to the current channel quality includes the RS-CINR, the first range includes that the RS-CINR is greater than the third threshold, and the second range includes that the RS-CINR is less than the third threshold; or if the parameter related to the current channel quality includes the PL, the first range includes that the PL is less than the fourth threshold, and the second range includes that the $P_L$ is greater than the fourth threshold.

In an optional implementation of this application:

if the current channel quality includes the RSRP, an RSRP of the first channel quality is greater than the first threshold, and an RSRP of the second channel quality is less than the first threshold; or if the current channel quality includes the RSRQ, RSRQ of the first channel quality is greater than the second threshold, and RSRQ of the second channel quality is less than the second threshold; or if the current channel quality includes the RS-CINR, an RS-CINR of the first channel quality is greater than the third threshold, and an RS-CINR of the second channel quality is less than the third threshold; or if the current channel quality includes the PL, a PL of the first channel quality is less than the fourth threshold, and a PL of the second channel quality is greater than the fourth threshold.

In an optional implementation of this application, the transceiver unit is specifically configured to receive GF configuration information sent by the base station; and the processing unit is further configured to perform calculation based on the GF configuration information, to determine the first range and the second range.

In an optional implementation of this application, if the first range includes that the RSRP is greater than the first threshold, and the second range includes that the RSRP is less than the first threshold, the processing unit is specifically configured to perform calculation according to a first preset formula based on a maximum transmit power, $P_{CMAX}$, of the terminal device, a reference transmit power, $P_{T,RS}$, of a downlink signal, and the GF configuration information, to obtain the first threshold.

In an optional implementation of this application, the first preset formula includes:

$$\text{RSRP\_thr} = P_{T,RS} - \frac{P_{CMAX} - P_O - 10*lg(2^\mu * M) - \Delta - f}{\alpha} - \text{delta\_RSRP},$$

where

RSRP_thr is the first threshold, $P_O$ is a receive power of the downlink signal, α is a path loss impact factor, μ is a subcarrier spacing indicator, M is an uplink transmission resource size, Δ is a preset parameter, f is a dynamic power control parameter, delta_RSRP is a preset parameter, and delta_RSRP>=0.

In an optional implementation of this application, the processing unit is specifically configured to measure the downlink signal by using the transceiver unit, to obtain a value of the RSRP.

In an optional implementation of this application, if the parameter related to the channel quality includes the RSRQ, the processing unit is specifically configured to:
  measure the downlink signal by using the transceiver unit, to obtain the value of the RSRP;
  detect a signal in receive bandwidth by using the transceiver unit, to obtain a value of a reference signal strength indicator RSSI; and
  perform calculation based on the value of the RSRP and the value of the RSSI according to a second preset formula, to obtain a value of the RSRQ, where the second preset formula includes: RSRQ=N*RSRP/RSSI, and N is a quantity of subcarriers in the receive bandwidth.

In an optional implementation of this application, if the parameter related to the channel quality includes the RS-CINR, the processing unit is specifically configured to:
  measure the downlink signal by using the transceiver unit, to obtain the value of the RSRP;
  detect the signal in the receive bandwidth by using the transceiver unit, to obtain the value of the reference signal strength indicator RSSI; and
  perform calculation based on the RSRP and the RSSI according to a third preset formula, to obtain the value of the RSRQ, where the third preset formula includes: RS-CINR=N*RSRP/(RSSI−N*RSRP), and N is the quantity of subcarriers in the receive bandwidth.

In an optional implementation of this application, if the parameter related to the channel quality includes the PL, the processing unit is specifically configured to:
  obtain a value of the reference transmit signal power $P_{T,RS}$ of the downlink signal; obtain a value of a receive power $P_{R,RS}$ of the downlink signal; and perform calculation based on $P_{T,RS}$ and $P_{R,RS}$ according to a fourth preset formula, to obtain a value of the PL, where the fourth preset formula includes: $P_L = P_{T,RS} - P_{R,RS}$.

In an optional implementation of this application, the transceiver unit is further configured to: if the current channel quality is the second channel quality, transmit the to-be-transmitted data by using the grant-based GB resource.

In an optional implementation of this application, the terminal device further includes:
  the processing unit is further configured to: before the terminal device obtains the current channel quality, obtain a service corresponding to the to-be-transmitted data; and
  the transceiver unit is further configured to: if the processing unit determines that the service is not in a preset list, transmit the to-be-transmitted data by using the GF resource; or
  the processing unit is further configured to: if the processing unit determines that the target service is in a preset list, perform the step of obtaining current channel quality.

According to a third aspect, this application provides a terminal device. The terminal device may include:
  one or more processors, one or more memories, a bus, and an input/output interface, where the one or more processors, the one or more memories, and the input/output interface are connected by using the bus; the one or more memories are configured to store program code; and when invoking the program code in the memory, the one or more processors perform the steps performed by the terminal device according to any one of the first aspect or the implementations of the first aspect of this application.

According to a fourth aspect, this application provides a terminal device. The terminal device may include one or more processors, one or more memories, and one or more transceivers; where:
  the one or more transceivers are configured to: receive and send data;
  the one or more memories are configured to store an instruction; and
  the one or more processors are configured to: invoke and execute the instruction in the one or more memories, so that the terminal device performs the steps performed by the terminal device according to any one of the first aspect or the implementations of the first aspect of this application.

According to a fifth aspect, this application provides a computer readable storage medium. It should be noted that the technical solutions of this application essentially, or the part contributing to the prior art, or all or some of the technical solutions may be implemented in a form of a software product. The computer software product is stored in a storage medium, and is configured to store a computer software instruction used by the foregoing device. The computer software instruction includes a program designed for the terminal device according to any one of the first aspect or the implementations of the first aspect.

The storage medium includes any medium that can store program code, such as a USB flash drive, a removable hard disk, a read-only memory (ROM), a random access memory (RAM), a magnetic disk, or an optical disc.

According to a sixth aspect, an embodiment of this application provides a computer program product including an instruction. When the computer program product is run on a computer, the computer is enabled to perform the method according to any one of the first aspect or the optional implementations of the first aspect of this application.

According to a seventh aspect, this application provides an apparatus. The apparatus may be applied to a terminal device. The apparatus is coupled to one or more memories, and is configured to: read and execute an instruction stored in the one or more memories, so that the terminal device implements the method according to any one of the first aspect or the implementations of the first aspect. The one or more memories may be integrated into the apparatus, or may be independent of the apparatus.

In an optional implementation of this application, the apparatus may be a chip or a system-on-a-chip (SoC).

In the embodiments of this application, before sending the to-be-transmitted data, the terminal device detects the current channel quality, where the first channel quality is better than the second channel quality. If the current channel quality is the first channel quality, it may be understood that the channel quality is relatively good and transmission is stable in this case, and therefore the terminal device may transmit the to-be-transmitted data by using the GF resource, or transmit the to-be-transmitted data by using the GB resource (this may be understood as that when the channel quality is relatively good, the terminal device may select one of the GF resource and the GB resource based on a requirement, and may choose whether to transmit the to-be-transmitted data by using the GF resource or the GB resource). Even if the terminal device transmits the to-be-transmitted data by using the GF resource, because the channel quality is relatively good and transmission is stable, reliability of transmitting the data by using the GF resource can also be improved. If the current channel quality is the second channel quality, it may be understood that the channel quality is relatively poor and transmission is unstable in this case, and therefore the terminal device cannot transmit the to-be-transmitted data by using the GF resource (this may be understood as that when the channel quality is relatively poor, because a transmission failure or a transmission latency may be caused due to unreliable transmission if the terminal device transmits the to-be-transmitted data by using the GF resource, the terminal device cannot choose to transmit the to-be-transmitted data by using the GF resource). Therefore, a loss of the to-be-transmitted data that is caused by unstable channel quality can be avoided, and reliability of transmitting the data by using the GF resource can be improved.

DESCRIPTION OF EMBODIMENTS

This application provides a data transmission method and a terminal device, to reduce a data transmission latency and improve data transmission reliability.

Figure 1:
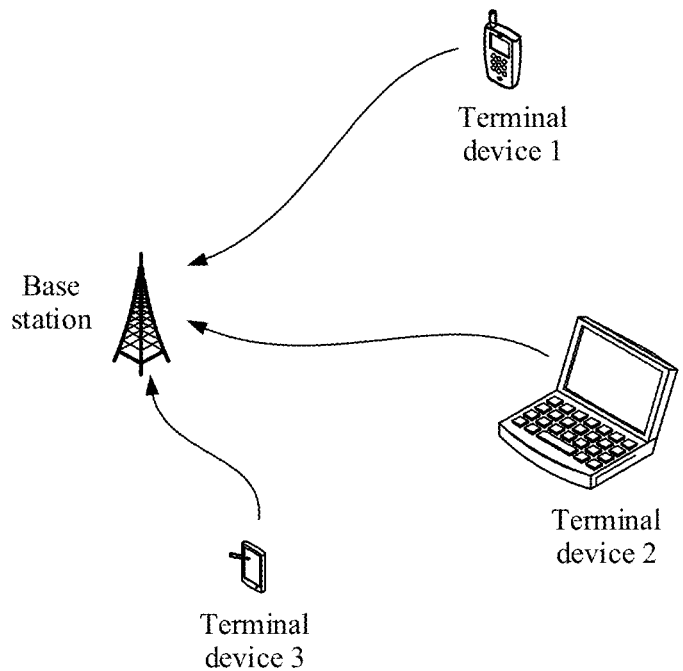
FIG. 1 is a schematic diagram of an application scenario of a data transmission method according to this application.

An application scenario of the data transmission method provided in this application may be first shown in FIG. 1. A base station may access one or more terminal devices, for example, a terminal device 1, a terminal device 2, and a terminal device 3 in FIG. 1. The terminal device may also be referred to as a terminal below. The terminal and the terminal device in this application may be understood as a same device. The three terminal devices in FIG. 1 are merely examples for description. The base station may further access more or fewer terminal devices. Details are not described further herein.

The base station in this application may include a base station in each communications system, for example, an eNodeB (eNB) in long term evolution (LTE), a gNodeB (gNB) in new radio (NR), or the like. For example, from a perspective of a product form, the base station is a device having a central control function, for example, a macro base station, a micro base station, a pico (pico) cell, a femto cell, a transmission point (TP), a relay, and an access point (AP), which may be collectively referred to as a network device. UE is a device that can receive scheduling and indication information from the base station, and may be a terminal device, for example, a mobile phone, a computer, a band, a smartwatch, a data card, a sensor, and a station (STA), which may be collectively referred to as the terminal device. For a sidelink (namely, D2D), for example, a link between the band and the mobile phone in band-mobile phone-base station, the band may be considered as the UE, and the mobile phone may be considered as the base station.

The terminal device in this application may access one or more communications systems, for example, a base station (BS) in a global system for mobile communications (GSM), a wideband code division multiple access (WCDMA) mobile communications system, LTE, or NR. It should be understood that the terminal device in this application may alternatively include user equipment (UE).

In this application, GB transmission or GF transmission may be performed between the terminal device and the base station.

A GB transmission procedure may include: The terminal device first sends an SR command to the base station, to notify the base station that data needs to be transmitted. After receiving the SR command, the base station sends a scheduling message to the terminal device, so that the terminal determines a GB resource allocated to the terminal device, and the terminal device transmits the to-be-transmitted data by using the GB resource. During GB transmission, there is usually a scheduling latency in a process from sending the SR command to receiving the scheduling message by the terminal device. When the terminal device performs uplink transmission, there is a transmission latency. Therefore, during GB transmission, there are at least the scheduling latency and the transmission latency. For example, in an LTE system, there is a scheduling latency of at least 4 ms in a process from sending the SR command to receiving the scheduling message by the terminal device, and then there is a transmission latency of 4 ms in a process from receiving the scheduling message to transmitting uplink data by the terminal device. In other words, there is at least a latency of 8 ms in a process from sending a data transmission request to actually transmitting the uplink data by the terminal device.

A GF transmission procedure may include: The base station configures a GF resource for the terminal device in advance, where the GF resource is a periodic resource. When the terminal device needs to transmit data, the terminal device may directly perform transmission on the GF resource configured by the base station. Because the terminal device does not need to send an SR command or wait for scheduling by the base station, GF transmission can reduce a scheduling latency compared with GB transmission. The GF resource may be usually a physical uplink shared channel (PUSCH) resource.

GF transmission may be applied to ultra-reliable and low latency communications (URLLC) in 5G, or may support massive machine-type communications (mMTC), or may be applied to a mobile broadband (MBB) service, or the like, to reduce a data transmission latency and improve data transmission efficiency.

According to the current 5G standard, after the terminal device transmits the to-be-transmitted data in a GF manner, if the terminal device does not receive an uplink scheduling grant (UL Grant) within preset duration, the terminal device considers that the base station has successfully received the to-be-transmitted data. When the terminal device receives, within the preset duration, the UL Grant sent by the base station, the terminal device considers that the base station does not correctly receive the to-be-transmitted data, and retransmits the to-be-transmitted data by using a GB resource scheduled by the UL Grant. However, when the terminal device sends the to-be-transmitted data, if all the to-be-transmitted data is lost in a transmission process, especially when the base station does not detect any sent signal of the terminal device, the base station naturally does not send any feedback to the terminal device. However, according to the foregoing rule, the terminal device considers that the data has been successfully received by the base station, and therefore does not retransmit the data. It is clear that this reduces reliability of transmitting data by the terminal device based on the GF resource. For example, if channel quality suddenly changes when the terminal device transmits the to-be-transmitted data, for example, the terminal device enters an elevator, is suddenly blocked, or enters confined space, the to-be-transmitted data cannot be normally transmitted, and the base station cannot receive complete to-be-transmitted data, or even cannot detect any signal.

Therefore, to improve GF transmission reliability, this application provides a data transmission method. The data transmission method provided in this application may be applied to a 5G communications system or another communications system in which data is transmitted by using a GF resource.

Figure 2:
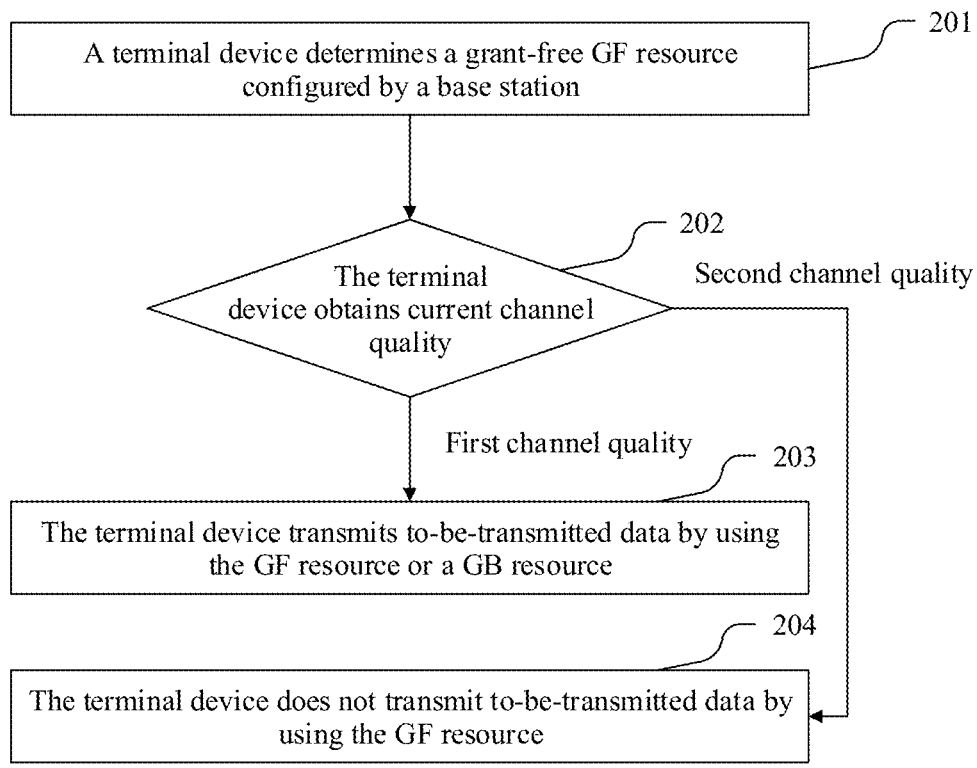
FIG. 2 is a possible schematic flowchart of a data transmission method according to this application.

Specifically, a procedure of the data transmission method provided in this application may be shown in FIG. 2, and may include the following steps.

201: A terminal device determines a GF resource configured by a base station.

First, before the terminal device performs GF transmission, the base station configures the GF resource for the terminal device. The GF resource may include related parameters such as a time domain resource and a frequency domain resource on an uplink channel that are allocated by the base station to the terminal device, so that the terminal device can perform GF transmission by using the GF resource.

For example, GF transmission may be performed based on a physical uplink shared channel (PUSCH). Therefore, the GF resource may include PUSCH-related information, for example, a time-frequency resource and a transmission period on the PUSCH. The PUSCH may be used to carry uplink service data of the terminal device, and the like. The terminal device may perform GF transmission through the PUSCH.

202: The terminal device obtains a current channel quality, and performs step 203 if the current channel quality is a first channel quality; or performs step 204 if the current channel quality is a second channel quality.

In this embodiment of this application, before the terminal device sends to-be-transmitted data, the terminal device may first obtain the current channel quality. Then, the terminal device identifies the current channel quality. If the current channel quality is the first channel quality, the terminal device performs step 203, that is, transmits the to-be-transmitted data by using the GF resource or a GB resource. If the current channel quality is the second channel quality, the terminal device performs step 204, that is, does not transmit the to-be-transmitted data by using the GF resource. In addition, the first channel quality falls with a first range, the second channel quality falls within a second range, the first channel quality is better than the second channel quality, and the first range is different from the second range.

That the first range is different from the second range may be that the first range and the second range have no intersection, or the first range is different from the second range, but the first range and the second range each may include a critical value. For example, if the first range is that an RSRP is greater than or equal to a first threshold, and the second range is that the RSRP is less than or equal to the first threshold, when the RSRP is equal to the first threshold, the RSRP may fall within the first range, and may fall within the second range. This may be specifically adjusted based on an actual application scenario. The RSRP herein is merely an example for description. The first range and the second range may be further related to other parameters, such as RSRQ and a PL. Details are not described herein.

In an implementation, that the terminal device obtains current channel quality may include: the terminal device may periodically measure a reference signal delivered by the base station, to obtain a downlink channel quality. Therefore, the terminal device may directly obtain, from the channel quality obtained by periodically measuring the reference signal delivered by the base station, the channel quality measured within a preset time period, and uses the measured channel quality as the current channel quality, for example, may obtain a last measured channel quality from the channel quality obtained by periodically measuring the reference signal delivered by the base station, and uses the last measured channel quality as the current channel quality.

In an implementation, the terminal device may alternatively receive a downlink signal sent by the base station, and measure the current channel quality based on the downlink signal. The downlink signal may be a downlink data signal, a downlink control signal, or the like sent by the base station to the terminal device.

It should be understood that in this embodiment of this application, the terminal device may measure the obtained current channel quality by measuring the downlink signal sent by the base station. This directly reflects the channel quality of a downlink channel. The downlink channel and an uplink channel usually have reciprocity. For example, if the channel quality of the downlink channel is poor, channel quality of the uplink channel is usually poor. Therefore, the current channel quality may be understood as the current channel quality of the uplink channel.

203: The terminal device transmits the to-be-transmitted data by using the GF resource or the GB resource.

When the terminal device determines that the current channel quality is the first channel quality, the terminal device may transmit the to-be-transmitted data by using the GF resource or the GB resource configured by the base station.

It may be understood that if the current channel quality is the first channel quality, the current channel quality is relatively good, and a probability of a data loss (that is, the terminal performs transmission by using the GF resource but the base station does not detect any signal) is relatively low. Therefore, the terminal device may transmit the to-be-transmitted data by using the GF resource, or may choose to transmit the to-be-transmitted data by using the GB resource.

Specifically, the GF resource configured by the base station for the terminal device may include parameters such as a transmission time-frequency resource and a transmission period. For example, if the base station configures a period resource of a PUSCH channel that is used for GF transmission for the terminal device, the terminal device may perform GF transmission on the to-be-transmitted data through the PUSCH channel.

It should be understood that in this embodiment of this application, the base station configures an uplink resource for the terminal. The uplink resource may be the PUSCH channel, another uplink channel, or the like. This may be specifically adjusted based on an actual application scenario, and is not limited herein.

In an implementation, to further reduce a data transmission latency, to-be-transmitted data for which a channel quality needs to be first determined may be determined by presetting a whitelist. For example, a whitelist may be established, and the whitelist may include a service that has a relatively high latency and reliability requirement. If a service corresponding to the to-be-transmitted data is in the whitelist, the current channel quality may be obtained. The current channel quality may be directly obtained by measuring the downlink signal, or may be obtained from the channel quality obtained through a measurement periodically performed by the terminal device. If the current channel quality is the first channel quality, the terminal device may transmit the to-be-transmitted data by using the GF resource or the GB resource. If a service corresponding to the to-be-transmitted data is not in the whitelist, the terminal device does not need to determine, based on the current channel quality, whether GF transmission can be performed, and may directly perform transmission by using the GF resource, or directly perform GB transmission, or the like. Therefore, in this embodiment of this application, the whitelist may be established, and channel quality determining is performed only on data corresponding to the service in the whitelist, so that the data corresponding to the service in the whitelist can be more reliably transmitted, a transmission latency is shorter, and user experience is improved. For a service that is not in the whitelist, whether transmission can be performed by using the GF resource does not need to be determined based on the channel quality, so that calculation overheads are reduced without affecting user experience.

204: The terminal device does not transmit the to-be-transmitted data by using the GF resource.

When the terminal device determines that the current channel quality is the second channel quality, the terminal device does not transmit the to-be-transmitted data by using the GF resource.

It may be understood that if the current channel quality is the second channel quality, the current channel quality is relatively poor, and a probability of a data loss (that is, the terminal performs transmission by using the GF resource but the base station does not detect any signal) is relatively high. Therefore, to improve data transmission reliability, the terminal device does not transmit the to-be-transmitted data by using the GF resource in this case.

In an implementation, when the terminal device does not transmit the to-be-transmitted data by using the GF resource, the terminal device may transmit the to-be-transmitted data by using the GB resource, to improve data transmission reliability.

In an implementation, before the terminal device transmits the to-be-transmitted data by using the GB resource, the terminal device may further receive the GB resource configured by the base station. The terminal device may determine, by using the GB resource sent by the base station, information such as a frequency domain resource and a time domain resource that are configured by the base station for the terminal device, so that the terminal device can transmit the to-be-transmitted data by using the GB resource. The GB resource is usually indicated by DCI (Downlink Control Information) sent by the base station on a physical downlink control channel (PDCCH).

In an implementation, when the terminal device does not transmit the to-be-transmitted data by using the GF resource, the terminal device may monitor the channel quality. If the channel quality changes to the first channel quality after a period of time, and the to-be-transmitted data is still not sent (for example, the terminal device always fails to obtain the GB resource), the terminal device may continue to choose to transmit the to-be-transmitted data by using the GF resource, so that the terminal device can transmit the to-be-transmitted data through a low-latency path, to improve reliability of transmitting the data by using the GF resource.

In this embodiment of this application, before sending the to-be-transmitted data, the terminal device may obtain the current channel quality. The first channel quality is better than the second channel quality. If the current channel quality is the first channel quality, it may be understood that the channel quality is relatively good and transmission is stable in this case, and therefore the terminal device may transmit the to-be-transmitted data by using the GF resource. If the current channel quality is the second channel quality, it may be understood that the channel quality is relatively poor and transmission is unstable in this case, and therefore the terminal device may not transmit the to-be-transmitted data by using the GF resource. Therefore, in this embodiment of this application, the terminal device chooses to transmit the to-be-transmitted data by using the GF resource only in a scenario in which the channel quality is relatively good. This can avoid a case in which the to-be-transmitted data is lost due to unstable channel quality, to improve reliability of transmitting the data by using the GF resource.

In this application, to reflect the channel quality, a parameter related to the current channel quality may include one or more parameters. Correspondingly, the first channel quality and the second channel quality may also be related to one or more related parameters corresponding to the current channel quality. For example, the parameter related to the current channel quality may include any one or more of a reference signal received power (RSRP), reference signal received quality (RSRQ), a reference signal carrier-to-interference-and-noise ratio (RS-CINR), or a path loss (PL) obtained by measuring the downlink signal. The parameters may be two or more parameters. Correspondingly, the first channel quality may meet at least one of the following corresponding to the current channel quality: the RSRP is greater than a first threshold, the RSRQ is greater than a second threshold, the RS-CINR is greater than a third threshold, the PL is less than a fourth threshold, or the like. The second channel quality may meet at least one of the following corresponding to the current channel quality: the RSRP is less than the first threshold, the RSRQ is less than the second threshold, the RS-CINR is less than the third threshold, the PL is greater than the fourth threshold, or the like.

It may be understood that if the parameter related to the current channel quality includes the RSRP, the first range includes that the RSRP is greater than the first threshold, and the second range includes that the RSRP is less than the first threshold; or if the parameter related to the current channel quality includes the RSRQ, the first range includes that the RSRQ is greater than the second threshold, and the second range includes that the RSRQ is less than the second threshold; or if the parameter related to the current channel quality includes the RS-CINR, the first range includes that the RS-CINR is greater than the third threshold, and the second range includes that the RS-CINR is less than the third threshold; or if the parameter related to the current channel quality includes the PL, the first range includes that the PL is less than the fourth threshold, and the second range includes that the PL is greater than the fourth threshold.

In addition, correspondingly, if the current channel quality includes the RSRP, an RSRP of the first channel quality is greater than the first threshold, and an RSRP of the second channel quality is less than the first threshold; or if the current channel quality includes the RSRQ, RSRQ of the first channel quality is greater than the second threshold, and RSRQ of the second channel quality is less than the second threshold; or if the current channel quality includes the RS-CINR, an RS-CINR of the first channel quality is greater than the third threshold, and an RS-CINR of the second channel quality is less than the third threshold; or if the current channel quality includes the PL, a PL of the first channel quality is less than the fourth threshold, and a PL of the second channel quality is greater than the fourth threshold.

The following further describes specific steps of selecting a transmission mode based on the current channel quality in the data transmission method provided in this application.

Figure 3:
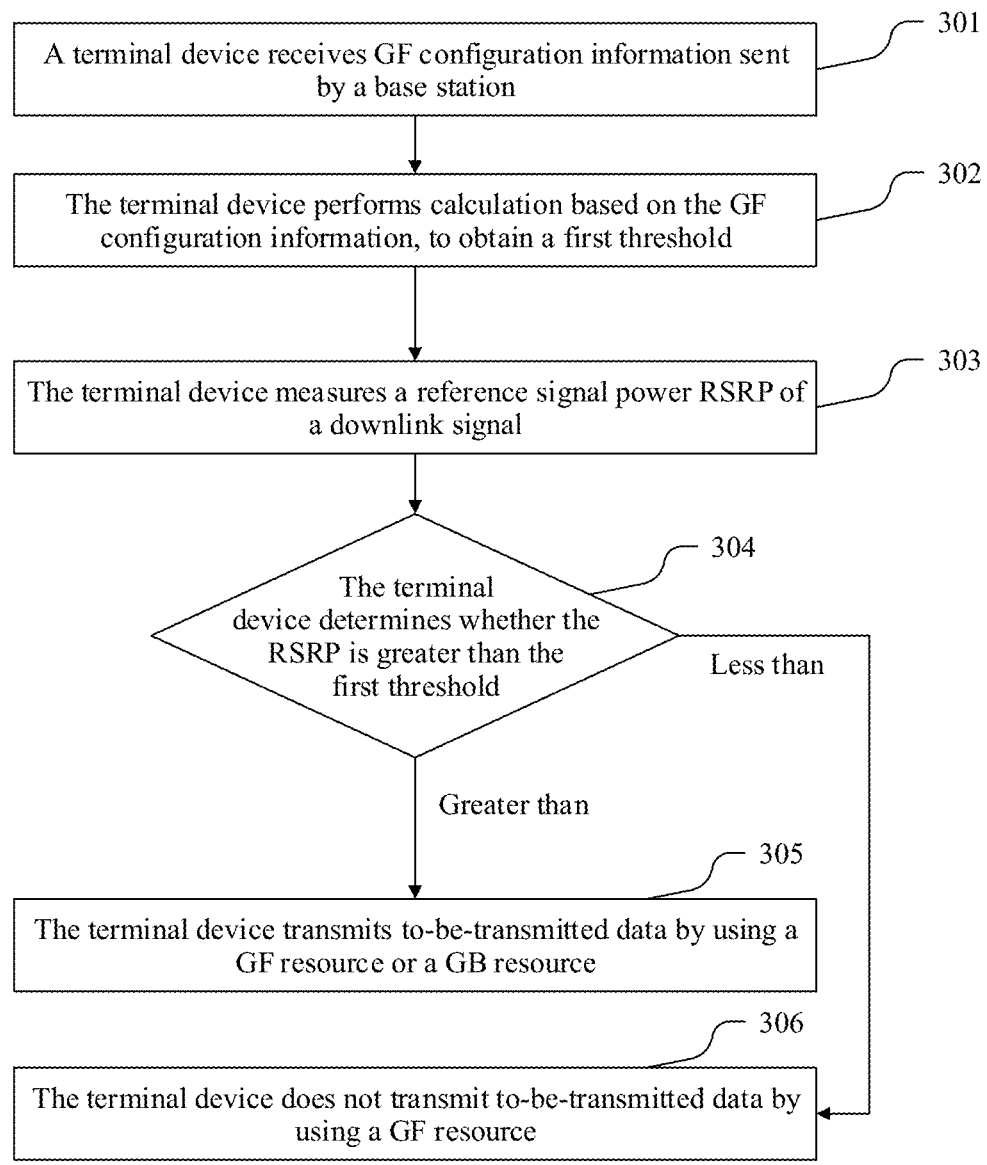
FIG. 3 is another possible schematic flowchart of a data transmission method according to this application.

First, when the current channel quality is related to the parameter RSRP, refer to FIG. 3, which is another schematic flowchart of a data transmission method according to an embodiment of this application. The method may include the following steps.

301: The terminal device receives GF configuration information sent by the base station.

The terminal device may first receive the GF configuration information sent by the base station. The GF configuration information may include a parameter related to a GF resource. For example, the GF configuration information may include a target receive power, a path loss impact factor, an uplink transmission resource size, a dynamic power control parameter, and the like. The terminal device may determine, based on the GF configuration information, a GF resource configured by the base station for the terminal device. The GF resource includes an uplink PUSCH channel allocated to the terminal device, and the like. The GF resource may be used to transmit to-be-transmitted data.

The GF configuration information may be sent by the base station by using one piece of information, or may be sent by the base station to the terminal device by using a plurality of pieces of information. For example, the target receive power and the path loss impact factor may be sent by the base station by using radio resource control (RRC) signaling, and the dynamic power control parameter may be sent by the base station to the terminal device by using downlink control information (DCI). A specific manner of sending the GF configuration information may be adjusted based on an actual application scenario, and sending manners in different communications systems may be the same or different. This is not limited herein.

302: The terminal device performs a calculation based on the GF configuration information, to obtain a first threshold.

After receiving the GF configuration information, the terminal device may perform a calculation based on the GF configuration information, to obtain the first threshold. The first threshold is a threshold corresponding to the RSRP.

For example, a specific manner of calculating the first threshold may include the following.

During GF transmission in the current 5G standard, the GF resource actually belongs to the PUSCH channel. Therefore, a transmit power of the terminal device may comply with a frequently-used PUSCH power determining rule:

$$P\_PUSCH = \text{Min}\{P_{CMAX}, P_0 + 10*\lg(2^{\mu}*M) + \alpha*PL + \Delta + f\}$$

Herein, P_PUSCH is a power at which transmission is performed through the PUSCH channel, $P_{CMAX}$ is a maximum transmit power of the terminal device, $P_0$ is the target receive power, α is the path loss impact factor, and both $P_0$ and α are configured by the base station by using the RRC signaling. μ is a subcarrier spacing indicator, and is related to a scalable numerology used by a current uplink transmission resource. For example, a subcarrier spacing of a current GF resource may be $2^{\mu}$+15 kHz, where μ=0, 1, 2, 3, ..., and a value of may be configured by the base station. M is the uplink transmission resource size, for example, a quantity of resource blocks (RB) on an uplink transmission resource configured by the base station. Δ is related to a modulation and coding scheme (MCS) for uplink transmission. For example, a larger data amount transmitted on a unit resource indicates a larger value of Δ. f is the dynamic power control parameter, and is obtained by the base station through configuration by using the DCI. The PL is a downlink path loss obtained by the UE through measurement based on a downlink reference signal, for example, may be measured based on a synchronization signal block (SSB), a channel state information reference signal (CSI-RS), or the like. More specifically, a specific manner of measuring the PL may be as follows: The terminal device may obtain a transmit power, $P_{T,RS}$, of the downlink reference signal sent by the base station, the terminal device may further obtain a receive power, $P_{R,RS}$ of the downlink reference signal through measurement based on the downlink reference signal, and the terminal device obtains a downlink path loss, $P_L = P_{T,RS} - P_{R,RS}$, through calculation. The transmit power, $P_{T,RS}$ of the downlink reference signal is usually obtained through calculation based on a total transmit power PBS of the base station and a quantity M (related to system bandwidth and a subcarrier spacing) of subcarriers included in the system bandwidth, that is, $P_{T,RS}=P_{BS}$. The total transmit power $P_{BS}$ of the base station is usually preset, for example, $P_{BS}$ =43 dBm.

In a scenario in which current GF configuration information from the base station is determined, $P_0$, α, μ, M, and f in the foregoing formula may remain unchanged. In this scenario, when the transmit power of the UE that is obtained through calculation according to the foregoing formula reaches $P_{CMAX}$, that is, $P_{PUSCH}=P_{CMAX}, P_{PUSCH}=P_{CMAX}$ the downlink path loss, $PL_0$, is $$PL_0 = \frac{P_{CMAX} - P_0 - 10*\lg(2^{\mu}*M) + \Delta + f}{\alpha}$$

in this case, namely, a path loss obtained when the transmit power of the UE reaches a maximum value.

Assuming that a transmit power of each subcarrier of the downlink reference signal is $P_{T,RS}$, a value of an RSRP obtained by the terminal device through measurement based on the downlink reference signal in this case is $P_{R,RS}$. That is, $$P_{R0,RS} = P_{T,RS} - PL_0 = P_{T,RS} - \frac{P_{CMAX} - P_0 - 10*\lg(2^{\mu}*M) + \Delta + f}{\alpha}.$$

The first threshold RSRP_thr may be $P_{R0,RS}$, that is, RSRP_thr=$P_{R0,RS}$.

In addition, in consideration of reliability, from a conservative perspective, the first threshold RSRP-thr may alternatively be:

$$\text{RSRP\_thr} = P_{R0,RS} + \text{delta\_RSRP}$$

Herein, delta_RSRP is a preset value, and delta_RSRP>=0.

Therefore, the first threshold is $$\text{RSRP\_thr} = P_{T,RS} - \frac{P_{CMAX} - P_0 - 10*lg(2^\mu * M) + \Delta + f}{\alpha} + \text{delta\_RSRP},$$

which is a first preset formula, where delta_RSRP>=0.

It may be understood that after the GF configuration information sent by the base station is received, it is assumed, according to the frequently-used PUSCH power determining rule, that the terminal device moves in a direction in which the terminal device is away from the base station, and a transmit power at a moment reaches the maximum value of the terminal device, that is, the terminal device performs transmission by using the maximum transmit power. In this case, the terminal device may obtain the downlink PL in this case through calculation, and obtain a receive power of a downlink signal through calculation based on the PL, namely, the first threshold. The receive power may be understood as a minimum receive power obtained when data transmission is in a stable state. If the receive power of the downlink signal received by the terminal device is less than the minimum receive power, it may be considered that data transmission is unstable, and a data loss easily occurs.

303: The terminal device measures an RSRP of the downlink signal.

When the parameter related to the current channel quality includes the RSRP, the terminal device further needs to measure a value of the RSRP of the downlink signal. The downlink signal may be a signal (for example, a downlink reference signal) periodically sent by the base station to the terminal device, or may be a signal (for example, a downlink data signal) used by the base station to send information to the terminal device.

Specifically, the terminal device may directly measure a received downlink signal power to determine the value of the RSRP.

It should be noted that in this embodiment of this application, step 302 may be first performed, or step 303 may be first performed, or step 302 and step 303 may be simultaneously performed. This may be specifically adjusted based on an actual application scenario, and is not limited herein.

304: The terminal device determines whether the RSRP is greater than the first threshold, and performs step 305 if the RSRP is greater than the first threshold; or performs step 306 if the RSRP is less than the first threshold.

After the terminal device obtains the value of the RSRP and the first threshold, the terminal device determines whether the RSRP is greater than the first threshold. If the RSRP is greater than the first threshold, the terminal device performs step 305. To be specific, the terminal device transmits the to-be-transmitted data by using the GF resource. If the RSRP is less than the first threshold, the terminal device performs step 306. To be specific, the terminal device does not transmit the to-be-transmitted data by using the GF resource.

305: The terminal device transmits the to-be-transmitted data by using the GF resource or a GB resource.

When the RSRP is greater than the first threshold, the terminal device may transmit the to-be-transmitted data by using the GF resource or the GB resource.

Specifically, the GF resource configured by the base station for the terminal device may include parameters such as a transmission time-frequency resource and a transmission period. For example, if the base station configures the GF resource for the terminal device on a PUSCH, the terminal device may perform GF transmission on the to-be-transmitted data by using the GF resource.

Specifically, when the to-be-transmitted data may be transmitted by using the GF resource, the terminal device may transmit the to-be-transmitted data by using the GF resource. However, after calculation is performed at a media access control (MAC) layer of the terminal device by using a decision algorithm, if the terminal device determines that the to-be-transmitted data is not transmitted by using the GF resource, the terminal device may not transmit the to-be-transmitted data by using the GF resource, for example, transmit the to-be-transmitted data in a GB manner.

306: The terminal device does not transmit the to-be-transmitted data by using the GF resource.

When the RSRP is less than the first threshold, the terminal device does not transmit the to-be-transmitted data by using the GF resource.

According to the formula for calculating the first threshold in step 302, it may be understood that when the transmit power of the terminal device reaches $P_{CMAX}$, the transmit power of the terminal device has reached the maximum value in this case. If the transmit power of the terminal device still cannot meet a transmit power requirement, a probability of a transmission failure of the to-be-transmitted data increases, and transmission reliability is reduced. Therefore, when the RSRP is less than the first threshold, the terminal device may not transmit the to-be-transmitted data by using the GF resource, to improve reliability of transmitting the to-be-transmitted data.

In addition, when the RSRP is less than the first threshold, the terminal device may not transmit the to-be-transmitted resource by using the GF resource within preset duration. The terminal device may monitor channel quality. If a value of an updated RSRP is greater than the first threshold within the preset duration, it may be understood that the channel quality is relatively good, and in this case, the terminal device may continue to choose to transmit the to-be-transmitted data by using the GF resource. For example, if the RSRP is greater than the first threshold after a period of time, and the to-be-transmitted data is still not sent (for example, the terminal device always fails to obtain the GB resource), the terminal device may continue to choose to transmit the to-be-transmitted data by using the GF resource, so that the terminal device can transmit the to-be-transmitted data through a low-latency path, to improve reliability of transmitting the data by using the GF resource.

It should be noted that in this embodiment of this application, when the value of the RSRP is equal to the first threshold, the terminal device may transmit the to-be-transmitted data by using the GF resource, or may not transmit the to-be-transmitted data by using the GF resource, or may randomly determine one from the GB resource and the GF resource to transmit the to-be-transmitted data. This may be specifically adjusted based on an actual application scenario. It may be understood that when the value of the RSRP is equal to the first threshold, the current channel quality may be a first channel quality, or may be a second channel quality, or it may be randomly determined whether the current channel quality is the first channel quality or the second channel quality. This may be specifically adjusted based on an actual application scenario.

In this embodiment of this application, the current channel quality may be related to the RSRP. The terminal device may measure the RSRP of the downlink signal. If the value of the RSRP is greater than the first threshold, it may be considered that the current channel quality is relatively good, and in this case, the terminal device may transmit the to-be-transmitted data by using the GF resource. If the value of the RSRP is less than the first threshold, it may be considered that the current channel quality is relatively poor, and in this case, the terminal device may not transmit the to-be-transmitted data by using the GF resource. Therefore, the terminal device transmits the to-be-transmitted data by using the GF resource only when the channel quality is relatively good and transmission is stable. The terminal device may not transmit the to-be-transmitted data by using the GF resource when the channel quality is relatively poor and transmission is unstable. In this way, a probability of a loss of the to-be-transmitted data can be reduced, and reliability of transmitting the data by using the GF resource can be improved.

Figure 4:
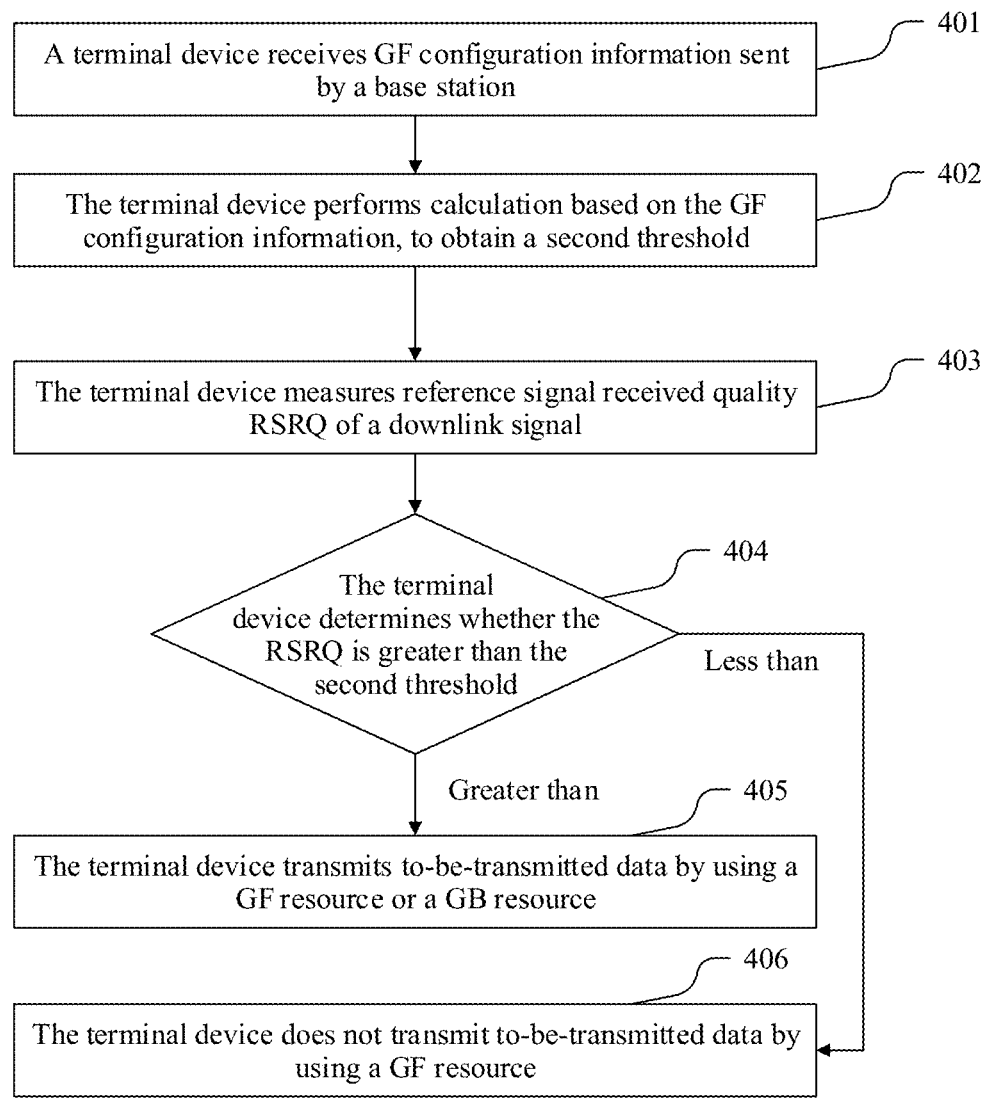
FIG. 4 is another possible schematic flowchart of a data transmission method according to this application.

In this application, the current channel quality may be measured by using RSRQ in addition to the RSRP. Specifically, FIG. 4 is another schematic flowchart of a data transmission method according to an embodiment of this application. The method may include the following steps.

401: The terminal device receives GF configuration information sent by the base station.

Step 401 in this embodiment of this application is similar to step 301 in FIG. 3. Details are not described herein again.

402: The terminal device performs calculation based on the GF configuration information, to obtain a second threshold.

After receiving the GF configuration information, the terminal device may perform calculation based on the GF configuration information, to obtain the second threshold. In this embodiment of this application, the current channel quality may be measured by using the RSRP. Therefore, the second threshold is a threshold corresponding to the RSRQ.

Specifically, a second preset formula for calculating the RSRQ may be: RSRQ=N*RSRP/RSSI. Herein, N is a quantity of subcarriers in receive bandwidth. The terminal device measures one of downlink signals transmitted in the receive bandwidth, to obtain a value of the RSRP. The terminal device may detect all downlink signals transmitted in the receive bandwidth, to obtain a value of a reference signal strength indicator RSSI. Therefore, with reference to the manner of calculating the first threshold in step 302, a first threshold of the RSRP may be obtained through calculation, and the first threshold may be understood as a minimum value of the RSRP. In this case, the second threshold may be obtained according to the second preset formula RSRQ=N*RSRP_thr/RSSI That is, $$RSQ\_thr = N^*\left[P_{T,RS} - \frac{P_{CMAX} - P_O - 10*lg(2^\mu *M) - \Delta - f}{\alpha} - \text{delta\_RSRP}\right]\bigg/ RSSI.$$

403: The terminal device measures a reference signal received quality RSRQ of the downlink signal.

When the parameter related to the current channel quality includes the RSRQ, the terminal device further needs to measure a value of the RSRQ of the downlink signal. The downlink signal may be a signal periodically sent by the base station to the terminal device, or may be a signal used by the base station to send information to the terminal device.

Specifically, a manner of obtaining the RSRQ of the downlink signal may be: obtaining the RSRQ through calculation according to the second preset formula RSRQ=N*RSRP/RSSI. Herein, N is the quantity of subcarriers in the receive bandwidth, and may be obtained by the terminal device by directly measuring the receive bandwidth. The value of the RSRP may be obtained by the terminal device by directly measuring the downlink signal. The value of the RSSI is obtained by the terminal device by measuring all the downlink signals in the receive bandwidth. The RSSI may be understood as a total receive power of all the downlink signals in the receive bandwidth, and is represented in a unit of dB. For example, the terminal device may measure a total receive power (in a unit of mw) of transmission signals in the receive bandwidth, and calculate the value of the RSSI. A specific calculation formula may be RSSI=10*log(W), and the RS SI is in a unit of dBm. Herein, W is a measured power of the transmission signal.

Specifically, it should be noted that in this embodiment of this application, step 402 may be first performed, or step 403 may be first performed, or step 402 and step 403 may be simultaneously performed. This may be specifically adjusted based on an actual application scenario, and is not limited herein.

404: The terminal device determines whether the RSRQ is greater than the second threshold, and performs step 405 if the RSRQ is greater than the second threshold; or performs step 406 if the RSRQ is less than the second threshold.

After the terminal device obtains the value of the RSRQ and the second threshold, the terminal device determines whether the RSRQ is greater than the second threshold. If the RSRQ is greater than the second threshold, the terminal device performs step 405. To be specific, the terminal device transmits to-be-transmitted data by using a GF resource. If the RSRQ is less than the second threshold, the terminal device performs step 406. To be specific, the terminal device does not transmit to-be-transmitted data by using a GF resource.

It should be noted that in this embodiment of this application, when the value of the RSRQ is equal to the second threshold, the terminal device may transmit the to-be-transmitted data by using the GF resource, or may not transmit the to-be-transmitted data by using the GF resource. This may be specifically adjusted based on an actual application scenario. It may be understood that when the value of the RSRQ is equal to the second threshold, the current channel quality may be first channel quality, or may be second channel quality, or it may be randomly determined whether the current channel quality is first channel quality or second channel quality. This may be specifically adjusted based on an actual application scenario.

405: The terminal device transmits the to-be-transmitted data by using the GF resource or a GB resource.

When the RSRQ is greater than the second threshold, the terminal device may transmit the to-be-transmitted data by using the GF resource or the GB resource. To be specific, when the current channel quality is the first channel quality, that is, when the current channel quality falls within a first range, the terminal device selects the GF resource or the GB resource to transmit the to-be-transmitted data.

Specifically, the GF resource configured by the base station for the terminal device may include parameters such as a transmission channel and a transmission period. For example, if the base station configures a PUSCH channel for the terminal device, the terminal device may perform GF transmission on the to-be-transmitted data through the PUSCH channel.

Specifically, the second threshold calculated in step 402 may be understood as a minimum value of the RSRQ for stable data transmission. If the RSRQ is greater than the second threshold, it may be considered that the current channel quality is relatively good, a probability of a data loss is relatively low, and transmission is relatively stable. In this case, the terminal device may choose to transmit the to-be-transmitted data by using the GF resource, to reduce a data transmission latency.

It should be noted that when the to-be-transmitted data may be transmitted by using the GF resource, the terminal device may transmit the to-be-transmitted data by using the GF resource. However, after calculation is performed at a MAC layer of the terminal device by using a decision algorithm, if the terminal device determines that the to-be-transmitted data is not transmitted by using the GF resource, the terminal device may not transmit the to-be-transmitted data by using the GF resource, for example, transmit the to-be-transmitted data in a GB manner.

406: The terminal device does not transmit the to-be-transmitted data by using the GF resource.

When the RSRQ is less than the second threshold, the terminal device does not transmit the to-be-transmitted data by using the GF resource. To be specific, when the current channel quality is the second channel quality, that is, when the current channel quality falls within a second range, the terminal device does not transmit the to-be-transmitted data by using the GF resource.

Specifically, the second threshold calculated in step 402 may be understood as a minimum value of the RSRQ for stable data transmission. If the RSRQ is less than the second threshold, it may be considered that the current channel quality is relatively poor, a probability of a data loss is relatively high, and transmission is unstable. In this case, the terminal device may not transmit the to-be-transmitted data by using the GF resource, to avoid the data loss.

When a transmit power of the terminal device reaches $P_{CMAX}$, the transmit power of the terminal device has reached a maximum value in this case. If the transmit power of the terminal device still cannot meet a transmit power requirement, a probability of a transmission failure of the to-be-transmitted data increases, and transmission reliability is reduced. Therefore, when the RSRQ is less than the second threshold, the terminal device may not transmit the to-be-transmitted data by using the GF resource, to improve reliability of transmitting the to-be-transmitted data.

In addition, when the RSRQ is less than the second threshold, the terminal device may not transmit the to-be-transmitted resource by using the GF resource within preset duration. The terminal device may monitor channel quality. If updated RSRQ is less than the second threshold within the preset duration, it may be understood that the channel quality is relatively good, and in this case, the terminal device may continue to choose to transmit the to-be-transmitted data by using the GF resource. For example, if the RSRQ is greater than the second threshold after a period of time, and the to-be-transmitted data is still not sent (for example, the terminal device always fails to obtain the GB resource), the terminal device may continue to choose to transmit the to-be-transmitted data by using the GF resource, so that the terminal device can transmit the to-be-transmitted data through a low-latency path, to improve reliability of transmitting the data by using the GF resource.

In this embodiment of this application, the current channel quality may be related to the RSRQ. The terminal device may measure the RSRQ of the downlink signal. If the value of the RSRQ is greater than the second threshold, it may be considered that the current channel quality is relatively good, and in this case, the terminal device may transmit the to-be-transmitted data by using the GF resource. If the value of the RSRQ is less than the second threshold, it may be considered that the current channel quality is relatively poor, and in this case, the terminal device may not transmit the to-be-transmitted data by using the GF resource. Therefore, the terminal device transmits the to-be-transmitted data by using the GF resource only when the channel quality is relatively good and transmission is stable. The terminal device may not transmit the to-be-transmitted data by using the GF resource when the channel quality is relatively poor and transmission is unstable. In this way, a probability of a loss of the to-be-transmitted data can be reduced, and reliability of transmitting the data by using the GF resource can be improved.

The current channel quality may also be measured by using an RS-CINR.

Figure 5:
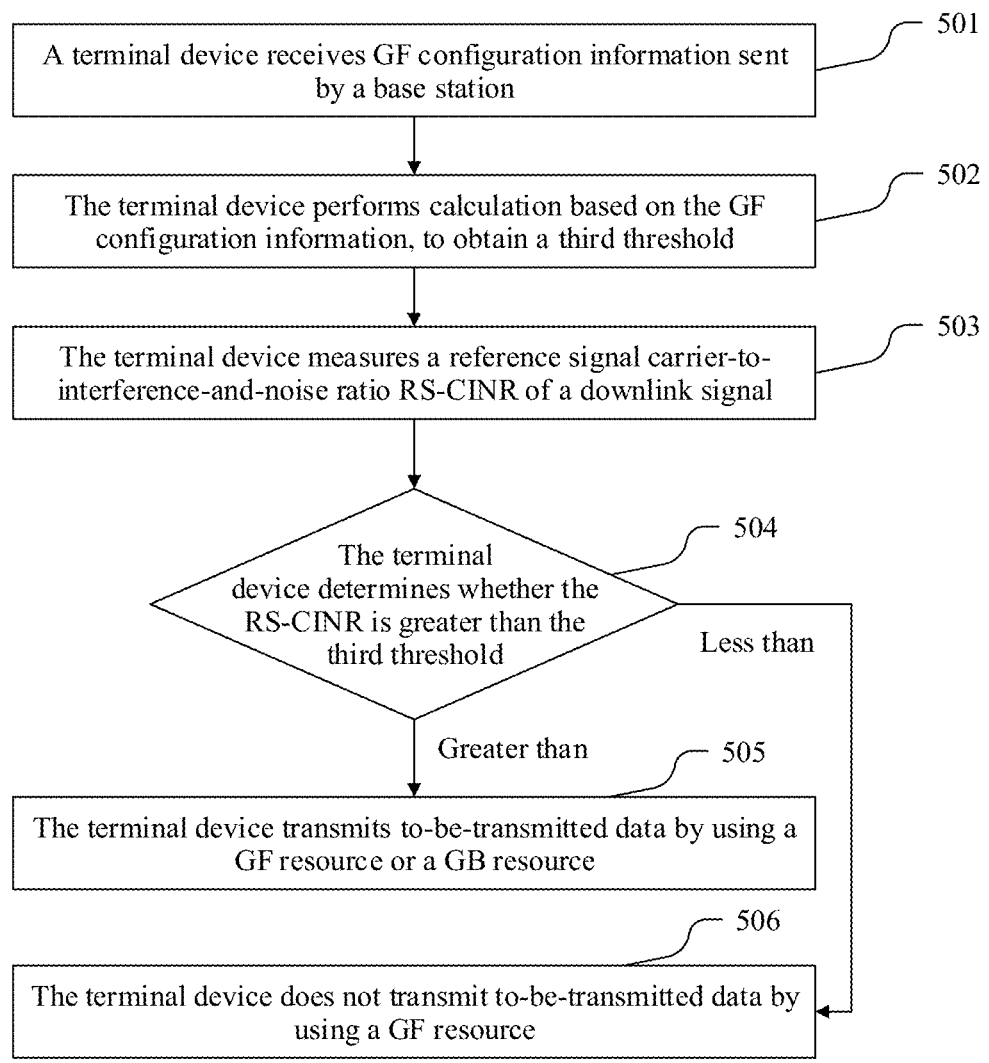
FIG. 5 is another possible schematic flowchart of a data transmission method according to this application.

Specifically, FIG. 5 is another schematic flowchart of a data transmission method according to an embodiment of this application. The method may include the following steps.

501: The terminal device receives GF configuration information sent by the base station.

Step 501 in this embodiment of this application is similar to step 301 in FIG. 3. Details are not described herein again.

502: The terminal device performs a calculation based on the GF configuration information, to obtain a third threshold.

After the terminal device obtains the GF configuration information, the terminal device performs a calculation based on the GF configuration information, to obtain the third threshold. In this embodiment of this application, the current channel quality may be measured by using the RS-CINR. Therefore, the third threshold is a threshold corresponding to the RS-CINR.

Specifically, a third preset formula for calculating the RS-CINR may be: RS-CINR=N*RSRP/(RSSI−N*RSRP). With reference to the first threshold obtained through calculation in step 302 in FIG. 3, the first threshold may be understood as a minimum value of the RSRP, and the third threshold corresponding to the RS-CINR may be obtained based on the first threshold.

That is CINR_thr=N*RSRP_thr/(RSSI−N*RSRP_thr), where RSRP_thr may be $$\text{RSRP\_thr} = P_{T,RS} - \frac{P_{CMAX} - P_0 - 10 * lg(2^\mu * M) + \Delta - f}{\alpha} - \text{delta\_RSRP}$$

obtained through calculation in step 302 in FIG. 3, and delta_RSRP>=0.

503: The terminal device measures a reference signal carrier-to-interference-and-noise ratio RS-CINR of a downlink signal.

When the parameter related to the current channel quality includes the RS-CINR, the terminal device may further measure the RS-CINR of the downlink signal.

Specifically, a manner of obtaining a value of the RSRQ of the downlink signal may be: obtaining the value of the RS-CINR through calculation according to the third preset formula RS-CINR=N*RSRP/(RSSI−N*RSRP) in step 502. Herein, N is a quantity of subcarriers in receive bandwidth, and may be obtained by the terminal device by directly measuring the receive bandwidth. The value of the RSRP may be obtained by the terminal device by directly measuring the downlink signal. The value of the RSSI is obtained by the terminal device by measuring a signal in the receive bandwidth. For example, the base station may measure a power of a transmission signal in the receive bandwidth, and calculate the value of the RS SI based on the power of the transmission signal. A specific calculation formula may be RSSI=10*log(W), and the RSSI is in a unit of dBm. Herein, W is the measured power of the transmission signal.

Specifically, it should be noted that in this embodiment of this application, step 502 may be first performed, or step 503 may be first performed, or step 502 and step 503 may be simultaneously performed. This may be specifically adjusted based on an actual application scenario, and is not limited herein.

504: The terminal device determines whether the RS-CINR is greater than the third threshold, and performs step 505 if the RS-CINR is greater than the third threshold; or performs step 506 if the RS-CINR is less than the third threshold.

After the terminal device obtains the value of the RS-CINR and the third threshold, the terminal device determines whether the RS-CINR is greater than the third threshold. If the RS-CINR is greater than the third threshold, the terminal device performs step 505. To be specific, the terminal device transmits to-be-transmitted data by using a GF resource. If the RS-CINR is less than the third threshold, the terminal device performs step 506. To be specific, the terminal device does not transmit to-be-transmitted data by using a GF resource.

It should be noted that in this embodiment of this application, when the value of the RS-CINR is equal to the third threshold, the terminal device may transmit the to-be-transmitted data by using the GF resource, or may not transmit the to-be-transmitted data by using the GF resource. This may be specifically adjusted based on an actual application scenario. It may be understood that when the value of the RS-CINR is equal to the third threshold, the current channel quality may be first channel quality, or may be second channel quality, or it may be randomly determined whether the current channel quality is first channel quality or second channel quality. This may be specifically adjusted based on an actual application scenario.

505: The terminal device transmits the to-be-transmitted data by using the GF resource or a GB resource.

When the RS-CINR is greater than the third threshold, the terminal device may transmit the to-be-transmitted data by using the GF resource or the GB resource. To be specific, when the current channel quality is the first channel quality, that is, when the current channel quality falls within a first range, the terminal device transmits the to-be-transmitted data by using the GF resource or the GB resource.

Specifically, the GF resource configured by the base station for the terminal device may include parameters such as a transmission time-frequency resource and a transmission period. For example, if the base station configures a PUSCH channel for the terminal device, the terminal device may perform GF transmission on the to-be-transmitted data through the PUS CH channel.

Specifically, the third threshold is calculated in step 502, and the third threshold may be understood as a minimum value of the RS-CINR for stable data transmission. If the RS-CINR is greater than the third threshold, it may be considered that the current channel quality is relatively good, a probability of a data loss is relatively low, and transmission is relatively stable. In this case, the terminal device may choose to transmit the to-be-transmitted data by using the GF resource.

It should be noted that when the to-be-transmitted data may be transmitted by using the GF resource, the terminal device may transmit the to-be-transmitted data by using the GF resource. However, after calculation is performed at a MAC layer of the terminal device by using a decision algorithm, if the terminal device determines that the to-be-transmitted data is not transmitted by using the GF resource, the terminal device may not transmit the to-be-transmitted data by using the GF resource, for example, transmit the to-be-transmitted data in a GB manner.

506: The terminal device does not transmit the to-be-transmitted data by using the GF resource.

When the RS-CINR is less than the third threshold, the terminal device does not transmit the to-be-transmitted data by using the GF resource. To be specific, when the current channel quality is the second channel quality, that is, when the current channel quality falls within a second range, the terminal device does not transmit the to-be-transmitted data by using the GF resource.

The third threshold is calculated in step 502, and the third threshold may be understood as a minimum value of the RS-CINR for stable data transmission. If the RS-CINR is less than the third threshold, it may be considered that the current channel quality is relatively good, and a data loss easily occurs. In this case, the terminal device may not transmit the to-be-transmitted data by using the GF resource.

When a transmit power of the terminal device reaches $P_{CMAX}$, the transmit power of the terminal device has reached a maximum value in this case. If the transmit power of the terminal device still cannot meet a transmit power requirement, a probability of a transmission failure of the to-be-transmitted data increases, and transmission reliability is reduced. Therefore, when the RS-CINR is less than the third threshold, the terminal device may not transmit the to-be-transmitted data by using the GF resource, to improve reliability of transmitting the to-be-transmitted data.

In addition, when the RS-CINR is less than the third threshold, the terminal device may not transmit the to-be-transmitted resource by using the GF resource within preset duration. The terminal device may monitor channel quality. If the RS-CINR is updated to be less than the third threshold within the preset duration, it may be understood that the channel quality is relatively good, and in this case, the terminal device may continue to choose to transmit the to-be-transmitted data by using the GF resource. For example, if the RS-CINR is greater than the third threshold after a period of time, and the to-be-transmitted data is still not sent (for example, the terminal device always fails to obtain the GB resource), the terminal device may continue to choose to transmit the to-be-transmitted data by using the GF resource, so that the terminal device can transmit the to-be-transmitted data through a low-latency path, to improve reliability of transmitting the data by using the GF resource.

In this embodiment of this application, the current channel quality may be related to the RS-CINR. The terminal device may measure the RS-CINR of the downlink signal. If the RS-CINR is greater than the third threshold, it may be considered that the current channel quality is relatively good, and in this case, the terminal device may transmit the to-be-transmitted data by using the GF resource. If the RS-CINR is less than the third threshold, it may be considered that the current channel quality is relatively poor, and in this case, the terminal device may not transmit the to-be-transmitted data by using the GF resource. Therefore, the terminal device transmits the to-be-transmitted data by using the GF resource only when the channel quality is relatively good and transmission is stable. The terminal device may not transmit the to-be-transmitted data by using the GF resource when the channel quality is relatively poor and transmission is unstable. In this way, a probability of a loss of the to-be-transmitted data can be reduced, and reliability of transmitting the data by using the GF resource can be improved.

Figure 6:
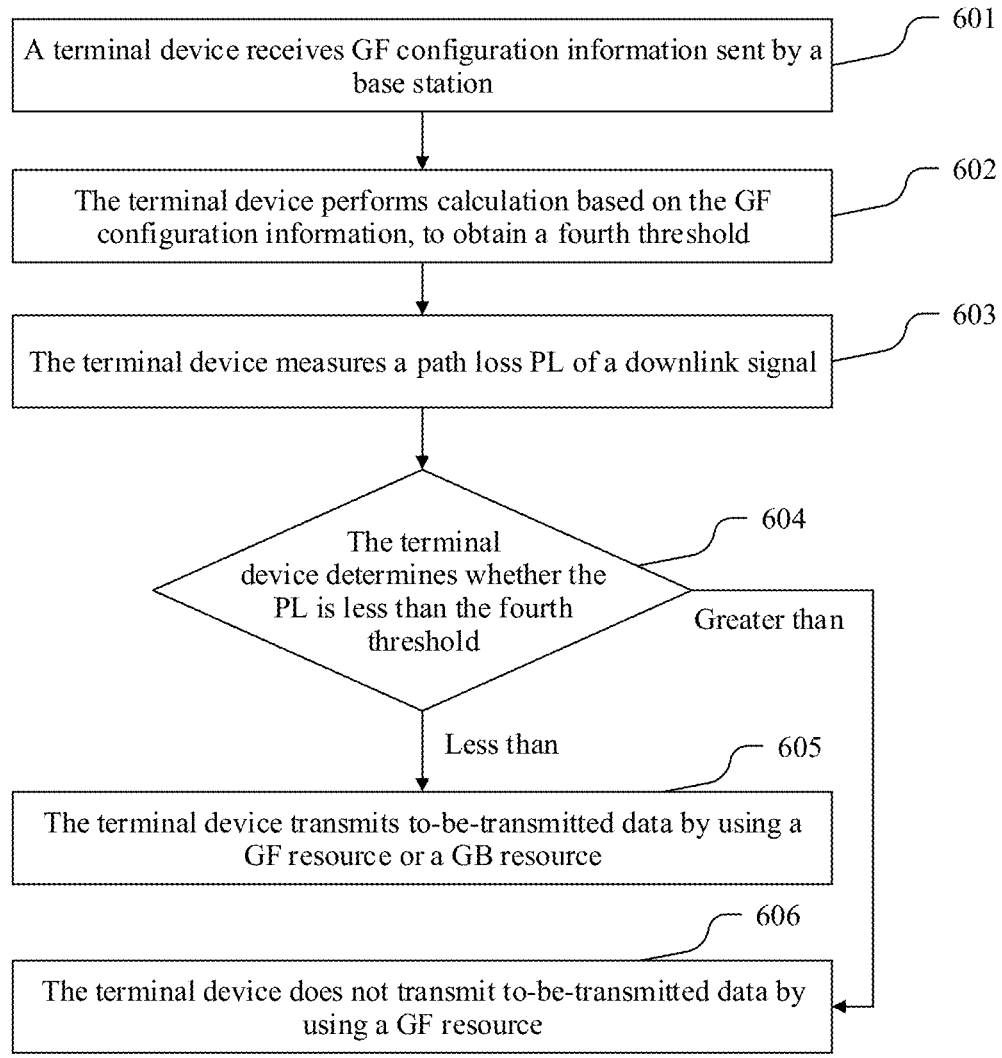
FIG. 6 is another possible schematic flowchart of a data transmission method according to this application.

The current channel quality may also be measured by using a PL. Specifically, FIG. 6 is another schematic flowchart of a data transmission method according to an embodiment of this application. The method may include the following steps.

601: The terminal device receives GF configuration information sent by the base station.

Step 601 in this embodiment of this application is similar to step 301 in FIG. 3. Details are not described herein again.

602: The terminal device performs a calculation based on the GF configuration information, to obtain a fourth threshold.

In this embodiment of this application, after receiving the GF configuration information sent by the base station, the terminal device may calculate the fourth threshold based on the configuration information. The parameter related to the current channel quality includes the PL, and therefore the fourth threshold is a threshold corresponding to the PL. Specifically, a manner of calculating the fourth threshold may be:

obtaining a maximum path loss $PL_0$ through calculation in step 302.

That is, the fourth threshold is $$PL\_thr = PL_0 = \frac{P_{CMAX} - P_0 - 10*lg(2^\mu * M) + \Delta + f}{\alpha}; \text{ or } PL\_thr =$$

$$PL_0 + \text{delta\_RSRP} = \frac{P_{CMAX} - P_0 - 10*lg(2^\mu * M) + \Delta + f}{\alpha} + \text{delta\_RSRP}.$$

Herein, delta_RSRP>=0.

603: The terminal device measures a path loss PL of a downlink signal.

The parameter related to the current channel quality includes the PL, and therefore the terminal device may measure a value of the PL of the downlink signal.

Specifically, calculation may be performed according to a fourth preset formula, where the fourth preset formula is $PL=P_{T,RS}-P_{R,RS}$. Herein, $P_{T,RS}$ is a transmit power of the downlink signal, and is sent by the base station to the terminal device, or is obtained through calculation based on a total transmit power $P_{BS}$ of the base station and a quantity M (related to system bandwidth and a subcarrier spacing) of subcarriers included in the system bandwidth. $P_{R,RS}$ is a receive power of the downlink signal measured by the base station. It may be understood that a difference between $P_{T,RS}$ and $P_{R,RS}$ is a power lost during transmission, namely, the PL.

It should be noted that in this embodiment of this application, step 602 may be first performed, or step 603 may be first performed, or step 602 and step 603 may be simultaneously performed. This may be specifically adjusted based on an actual application scenario, and is not limited herein.

604: The terminal device determines whether the PL is less than the fourth threshold, and performs step 605 if the PL is less than the fourth threshold; or performs step 606 if the PL is greater than the fourth threshold.

After the terminal device obtains the value of the PL and the fourth threshold, the terminal device determines whether the PL is greater than the fourth threshold. If the PL is less than the fourth threshold, the terminal device performs step 605. To be specific, the terminal device transmits to-be-transmitted data by using a GF resource. If the PL is greater than the fourth threshold, the terminal device performs step 606. To be specific, the terminal device does not transmit to-be-transmitted data by using a GF resource.

It should be noted that in this embodiment of this application, when the value of the PL is equal to the fourth threshold, the terminal device may transmit the to-be-transmitted data by using the GF resource, or may not transmit the to-be-transmitted data by using the GF resource. This may be specifically adjusted based on an actual application scenario. It may be understood that when the value of the PL is equal to the fourth threshold, the current channel quality may be first channel quality, or may be second channel quality, or it may be randomly determined whether the current channel quality is second channel quality or second channel quality. This may be specifically adjusted based on an actual application scenario.

605: The terminal device transmits the to-be-transmitted data by using the GF resource or a GB resource.

When the PL is less than the fourth threshold, the terminal device may transmit the to-be-transmitted data by using the GF resource or the GB resource. To be specific, when the current channel quality is the first channel quality, that is, when the current channel quality falls within a first range, the terminal device transmits the to-be-transmitted data by using the GF resource.

Specifically, when the PL is less than the fourth threshold, it may be understood that a power loss of data to be transmitted on a current channel is relatively small, a data transmission branch is relatively good, and a probability of a data loss is relatively low. Therefore, the terminal device may transmit the to-be-transmitted data by using the GF resource.

Specifically, the GF resource configured by the base station for the terminal device may include parameters such as a transmission channel and a transmission period. For example, if the base station configures a PUSCH channel for the terminal device, the terminal device may perform GF transmission on the to-be-transmitted data through the PUSCH channel.

It should be noted that when the to-be-transmitted data may be transmitted by using the GF resource, the terminal device may transmit the to-be-transmitted data by using the GF resource. However, after a calculation is performed at a MAC layer of the terminal device by using a decision algorithm, if the terminal device determines that the to-be-transmitted data is not transmitted by using the GF resource, the terminal device may not transmit the to-be-transmitted data by using the GF resource, for example, transmit the to-be-transmitted data by using the GB resource.

606: The terminal device does not transmit the to-be-transmitted data by using the GF resource.

When the PL is greater than the fourth threshold, the terminal device does not transmit the to-be-transmitted data by using the GF resource. To be specific, when the current channel quality is the second channel quality, that is, when the current channel quality falls within a second range, the terminal device does not transmit the to-be-transmitted data by using the GF resource.

Specifically, when the PL is greater than the fourth threshold, it may be understood that a power loss of data to be transmitted on a current channel is relatively large, a data transmission branch is relatively poor, a probability of a data loss is relatively high, and all or some data is easily lost.

Therefore, the terminal device may not transmit the to-be-transmitted data by using the GF resource, to avoid the data loss.

In addition, when the RS-CINR is less than the fourth threshold, the terminal device may not transmit the to-be-transmitted resource by using the GF resource within a preset duration. The terminal device may monitor a channel quality. If an updated PL is greater than the fourth threshold within the preset duration, it may be understood that the channel quality is relatively good, and in this case, the terminal device may continue to choose to transmit the to-be-transmitted data by using the GF resource.

In this embodiment of this application, the current channel quality may be related to the PL, and therefore the terminal device may measure the PL of the downlink signal. If the PL is less than the fourth threshold, it may be understood that the power loss of the data to be transmitted on the channel is relatively small, the channel quality is relatively good, and the probability of the loss of the to-be-transmitted data is relatively low. In this case, the terminal device may choose to transmit the to-be-transmitted data by using the GF resource. If the PL is greater than the fourth threshold, it may be understood that the power loss of the data to be transmitted on the channel is relatively large, the channel quality is relatively poor, and the to-be-transmitted data is easily lost. In this case, the terminal device may choose not to transmit the to-be-transmitted data by using the GF resource, to avoid the data loss. Therefore, in this embodiment of this application, the channel quality is measured by using the PL, so that the loss of the to-be-transmitted data can be avoided, and data transmission reliability can be improved.

It should be noted that in FIG. 2 to FIG. 6, specific processes of the steps in which the terminal device transmits the to-be-transmitted data by using the GF resource may be similar, and specific processes in which the terminal device does not transmit the to-be-transmitted data by using the GF resource may also be similar.

It should be noted that FIG. 3 to FIG. 6 show that the current channel quality is separately measured by using the RSRP, the RSRQ, the RS-CINR, and the PL, to choose whether to transmit the to-be-transmitted data by using the GF resource. In addition, another parameter that can be used to measure the channel quality may be further used to determine whether to transmit the to-be-transmitted data by using the GF resource. This may be specifically adjusted based on an actual application scenario. This is merely an example for description herein, and is not limited.

It should be further noted that in this application, in addition to one of the RSRP, the RSRQ, the RS-CINR, and the PL, the parameter related to the current channel quality may include more of the RSRP, the RSRQ, the RS-CINR, and the PL. For example, whether to choose to transmit the to-be-transmitted data by using the GF resource may be determined with reference to the RSRP and the RS-CINR; or whether to choose to transmit the to-be-transmitted data by using the GF resource may be determined with reference to the RSRP and the RSRQ; or whether to choose to transmit the to-be-transmitted data by using the GF resource may be determined with reference to the RSRP, the RSRQ, and the PL together. This may be specifically adjusted based on an actual application scenario, and is not limited in this application.

In an optional embodiment of this application, when the parameter related to the current channel quality may include more of the RSRP, the RSRQ, the RS-CINR, and the PL, the more parameters are two or more parameters. Correspondingly, parameters in conditions met by the first channel quality and the second channel quality may alternatively be parameters corresponding to at least two parameters related to the current channel quality. For example, if the parameter related to the current channel quality includes the RSRP, the RSRQ, and the PL, conditions included in the first channel quality may be: The RSRP is greater than a first threshold, the RSRQ is greater than a second threshold, and the PL is less than a fourth threshold; and conditions included in the second channel quality may be: The RSRP is less than the first threshold, the RSRQ is less than the second threshold, and the PL is greater than the fourth threshold. In this embodiment of this application, the current channel quality may be related to a plurality of parameters. The current channel quality is determined with reference to the plurality of parameters, so that an obtained result of the determining can be more accurate.

In an optional embodiment of this application, when all parameters in the current channel quality meet corresponding conditions in the first channel quality, it may be understood that the current channel quality is the first channel quality. When not all parameters in the current channel quality meet corresponding conditions in the first channel quality, it may be understood that the current channel quality is the second channel quality. In this embodiment of this application, the current channel quality is the first channel quality only when all the parameters related to the current channel quality meet the conditions met by the first channel quality, so that reliability of transmitting the data by using the GF resource can be further improved.

In an optional embodiment of this application, when all parameters related to the current channel quality meet all conditions in the first channel quality, or all parameters related to the current channel quality may meet one or more of conditions in the first channel quality, it may be considered that the current channel quality is the first channel quality. For example, if conditions included in the first channel quality may be: The RSRP is greater than a first threshold, the RSRQ is greater than a second threshold, and the PL is less than a fourth threshold, when the current channel quality may meet any one of the following: the RSRP is greater than the first threshold and the RSRQ is greater than the second threshold, the RSRP is greater than the first threshold and the PL is less than the fourth threshold, or the RSRQ is greater than the second threshold and the PL is less than the fourth threshold, it may be considered that the current channel quality is the first channel quality; or when the current channel quality does not meet the foregoing scenarios, it is considered that the current channel quality is the second channel quality. For another example, if conditions included in the first channel quality may be: the RSRP is greater than a first threshold, the RSRQ is greater than a second threshold, and the PL is less than a fourth threshold, it may be considered that the current channel quality is the first channel quality, provided that the parameters related to the current channel quality meet one of the conditions included in the first channel quality; or when the parameters related to the current channel quality do not meet any one of the conditions included in the first channel quality, it may be considered that the current channel quality is the second channel quality. Therefore, in this embodiment of this application, when some parameters related to the current channel quality meet the one or more of the conditions in the first channel quality, it may be considered that the current channel quality is the first channel quality, so that efficiency of selecting a transmission mode can be improved, a problem that relatively good channel quality is determined as relatively poor channel quality due to a measurement error can be avoided, and a resource waste can be avoided.

In some embodiments of this application, to improve data transmission reliability, a data transmission method is provided. The method may include:

measuring, by a terminal device, a downlink signal on a channel, to obtain a channel quality of the channel, where a grant-free GF resource is configured by a network device for the terminal device; and if the channel quality is greater than a first threshold, sending, by the terminal device, first uplink data by using the GF resource; or if the channel quality is less than the first threshold, skipping, by the terminal device, sending the first uplink data by using the GF resource, where the terminal device may determine, based on a comparison relationship between the current channel quality and the first threshold, whether data can be transmitted by using the GF resource, to avoid problems of unreliable transmission and an increase in a latency that are caused by GF transmission performed when the channel quality is relatively poor.

In an implementation, the skipping, by the terminal device, sending first uplink data by using the GF resource may include:

sending, by the terminal device, the first uplink data in a grant-based GB manner.

When the channel quality is relatively poor, the terminal device cannot perform GF transmission, but can still perform transmission in the GB manner. This ensures that the terminal device has an uplink transmission path at any time.

In an implementation, the channel quality is an RSRP of the downlink signal, RSRQ of the downlink signal, a CINR of the downlink signal, or a path loss of the channel.

The channel quality can be measured by using the RSRP, the RSRP, the CINR, or the path loss.

In an implementation, when the channel quality is the RSRP, the RSRQ, or the CINR,
that the channel quality is greater than a first threshold includes: the RSRP, the RSRQ, or the CINR is greater than the first threshold; and
that the channel quality is less than a first threshold includes: the RSRP, the RSRQ, or the CINR is less than the first threshold.

When the channel quality is measured by using the RSRP, the RSRQ, or the CINR, and a measured value of the channel quality is greater than the first threshold, the terminal device considers that the channel quality is relatively good, and may perform GF transmission.

In an implementation, when the channel quality is the path loss of the channel,
that the channel quality is greater than a first threshold includes: the pass loss is less than the first threshold; and
that the channel quality is less than a first threshold includes: the pass loss is greater than the first threshold.

When the channel quality is measured by using the pass loss, and a measured value of the channel quality is less than the first threshold, the terminal device considers that the channel quality is relatively good, and may perform GF transmission.

In an implementation, when the channel quality is the RSRP of the downlink signal, the first threshold, $P_{RO,RS}$, is obtained through calculation based on a maximum transmit power $P_{CMAX}$ of the terminal device, a transmit power, $P_{T,RS}$ of each subcarrier of the downlink signal, and GF configuration information for the terminal device.

When the channel quality is measured by using the RSRP, the terminal device may determine the first threshold based on $P_{CMAX}$, $P_{T,RS}$ and the GF configuration information.

In an implementation, the GF configuration information for the terminal device includes one or more of the following parameters: an uplink target receive power PO, a path loss coefficient α, a subcarrier spacing indicator an MCS configuration, a GF resource size indicator M, and a dynamic power control TPC indicator.

The GF configuration information is usually used by the terminal device to calculate a transmit power, and is used to determine the first threshold in this application.

In an implementation, that the first threshold, $P_{RO,RS}$ is obtained through calculation based on a maximum transmit power, $P_{RO,RS}$ of the terminal device, a transmit power, $P_{T,RS}$ of each subcarrier of the downlink signal, and GF configuration information for the terminal device includes:

$$P_{RO,RS} = P_{T,RS} - PL_0 = P_{T,RS} - \frac{P_{CMAX} - P_0 - 10*lg(2^\mu *M) + \Delta + f}{\alpha}; \text{ or}$$

$$P_{RO,RS} = P_{T,RS} - \frac{P_{CMAX} - P_0 - 10*lg(2^\mu *M) + \Delta + f}{\alpha} + \text{delta\_RSRP}.$$

Herein, f is related to the dynamic power control TPC indicator, A is related to the MCS configuration, and delta_RSRP is a positive value.

This embodiment provides a specific method for determining the first threshold by the terminal device.

In an implementation, before the measuring, by a terminal device, a downlink signal on the channel, the method includes:

receiving, by the terminal device, the GF configuration information sent by the network device.

Before determining the first threshold, the terminal device needs to first receive the GF configuration information sent by the base station, and then calculate the first threshold by using the GF configuration information.

In an implementation, if the channel quality is equal to the first threshold, the terminal device may send the first uplink data by using the GF resource.

In an implementation, if the channel quality is equal to the first threshold, the terminal device may not send the first uplink data by using the GF resource.

The following describes, in more detail by using a specific application scenario, the data transmission method provided in this application.

In the current 5G NR standard, GF transmission is performed in an implicit hybrid automatic repeat request (HARQ) manner. This may cause problems of low reliability and a high latency during GF transmission in some scenarios. GF transmission is usually used in a scenario in which there is a relatively high reliability and latency requirement. It is clear that the problems severely affect user experience. This application provides a new transmission method, to effectively avoid the foregoing problems, thereby improving data transmission reliability and reducing a transmission latency.

The terminal device receives a GF resource configured by the base station. Before sending first uplink data by using the GF resource, the terminal device detects a channel; and if channel quality is greater than a first threshold, the terminal device may send the first uplink data by using the GF resource; or if channel quality is less than a first threshold, the terminal device cannot send the first uplink data by using the GF resource.

That the terminal device cannot send the first uplink data by using the GF resource may specifically include: The terminal device may send the first uplink data in a grant-based manner; or the terminal device sends the first uplink data by using the GF resource after the channel quality improves (for example, when the channel quality is greater than the first threshold).

When the terminal device can choose from two transmission modes: a GF transmission mode and a GB transmission mode, because an implicit HARQ in the GF manner may cause unreliable transmission and a high latency, before performing transmission in the GF manner, the terminal device first needs to determine whether current channel quality meets a condition for performing transmission in the GF manner. If the current channel quality meets the condition, the terminal device may perform transmission in the GF manner; or if the current channel quality does not meet the condition, the terminal device performs transmission in the GB manner, or performs transmission in the GF manner after the channel quality improves.

It should be specially noted that when the channel quality is equal to the first threshold, processing may be performed in either of the foregoing two processing manners. In an embodiment, if the channel quality is greater than or equal to the first threshold, the terminal device may send the first uplink data by using the GF resource; or if the channel quality is less than the first threshold, the terminal device cannot send the first uplink data by using the GF resource. In another embodiment, if the channel quality is greater than the first threshold, the terminal device may send the first uplink data by using the GF resource; or if the channel quality is less than or equal to the first threshold, the terminal device cannot send the first uplink data by using the GF resource. For ease of description, a case in which the channel quality is equal to the first threshold is not specially described in the following part, and only two cases in which the channel quality is greater than and less than the first threshold are described. It is easily understood that "equal to" and "greater than" or "less than" may be considered as one case for processing.

The channel quality may be measured by using different parameters, and may be specifically one or more of the following.

Measuring the channel quality by using a downlink RSRP: the terminal device may obtain the downlink RSRP by detecting a downlink reference signal of the base station, where the downlink RSRP is denoted as $P_{R,RS}$. When $P_{R,RS}$>RSRP_thr, the terminal device may perform transmission by using the GF resource; or when $P_{R,RS}$<RSRP_thr, the terminal device does not perform transmission by using the GF resource. RSRP_thr is the first threshold.

Measuring the channel quality by using downlink RSRQ: The terminal device may obtain the downlink RSRP by detecting the downlink reference signal of the base station, and obtain an RSSI by detecting signals in entire receive bandwidth, to obtain the RSRQ through calculation based on the downlink RSRP and the RSSI, where RSRQ=N*RSRP/RSSI, and the RSRQ is denoted as RSRQ R. Herein, N is a quantity of subcarriers in the measurement bandwidth. When $RSRQ_R$>RSRQ_thr, the terminal device may perform transmission by using the GF resource; or when $RSRQ_R$<RSRQ_thr, the terminal device does not perform transmission by using the GF resource. RSRQ_thr is the first threshold.

Measuring the channel quality by using a downlink RS-CINR: The terminal device may obtain the downlink RSRP by detecting the downlink reference signal of the base station, and obtain the RSSI by detecting the signals in the entire receive bandwidth, to obtain the RS-CINR through calculation based on the downlink RSRP and the RSSI, where RS-CINR=N*RSRP/(RSSI−N*RSRP), and the RS-CINR is denoted as CINR R. When $CINR_R$>CINR_thr, the terminal device may perform transmission by using the GF resource; or when $CINR_R$<CINR_thr, the terminal device does not perform transmission by using the GF resource. CINR_thr is the first threshold. In this application, the RS-CINR is briefly referred to as a CINR.

Measuring the channel quality by using a downlink path loss: Assuming that a transmit power of the downlink reference signal is $P_{T,RS}$ (notified by the base station to the terminal device), and the terminal device may further obtain a receive power $P_{R,RS}$ of the downlink reference signal through measurement based on the downlink reference signal, the terminal device obtains the downlink path loss PL=$P_{T,RS}$ $P_{R,RS}$ through calculation. When PL<PL_thr, the terminal device may perform transmission by using the GF resource; or when PL>PL_thr, the terminal device does not perform transmission by using the GF resource. PL_thr is the first threshold.

Among the four parameters used to measure the channel quality, the RSRP is obtained by the terminal device through measurement, and the other three parameters are obtained through calculation based on measurement. Only the downlink reference signal needs to be measured, to calculate the RSRP; but to calculate the RSRQ and the RS-CINR, in addition to the downlink reference signal, signals (including a downlink reference signal, a downlink data signal, and the like) on an entire channel need to be measured. Usually, the terminal device measures signals to obtain channel quality. These signals are collectively referred to as downlink signals. For different parameters used to measure channel quality, specific downlink signals that need to be measured may be different. For example, only the downlink reference signal needs to be measured to measure the RSRP.

The terminal device may measure the channel quality by using any one of the foregoing parameters, or may measure the channel quality by using another parameter.

The terminal device may alternatively measure the channel quality by combining a plurality of parameters. For example, when $P_{RO,RS}$>RSRP_thr or $CINR_R$>CINR_thr, the terminal device considers that the channel quality is acceptable, and may perform transmission in the GF manner. When $P_{RO,RS}$<RSRP_thr and $CINR_R$>CINR_thr, the terminal device considers that the channel quality is relatively poor, and cannot transmit data in the GF manner.

The following describes, by using an example in which the channel quality is measured by using the RSRP, how to specifically determine RSRP_thr.

During GF transmission, a transmit power PPUSCH of the terminal device complies with a common PUSCH power determining rule:

$$\text{PUSCH} = \text{Min}\{P_{CMAX}, P_0 + 10*\lg(2^{\mu}*M) + a*PL + \Delta + f\} \quad (1)$$

Herein, $P_{CMAX}$ is a maximum transmit power of the terminal device, $P_0$ is a target receive power, α is a path loss impact factor, and both $P_0$ and α are configured by the base station by using RRC signaling. μ is a subcarrier spacing indicator, and is related to a numerology used by a current uplink transmission resource. To be specific, a subcarrier spacing of a current GF resource is $2^{\mu}+15$ kHz, where μ=0, 1, 2, 3, 4, . . . , and a value of μ is configured by the base station. M is an uplink transmission resource size, for example, a quantity of RBs on an uplink transmission resource configured by the base station. A is related to an MCS for uplink transmission, and the MCS is also configured by the base station. f is a dynamic power control parameter, and is configured by the base station by using DCI. The PL is a downlink path loss obtained by the terminal device through measurement based on a downlink reference signal, and the downlink reference signal is, for example, a synchronization signal block (SSB) or a channel state information reference signal (CSI-RS). Specifically, if the terminal device may obtain a transmit power $P_{T,RS}$ that is of the downlink reference signal and that is notified by the base station, and the terminal device may further obtain a receive power $P_{RO,RS}$ of the downlink reference signal through measurement based on the downlink reference signal, the terminal device obtains the downlink path loss PL=$P_{T,RS}$−$P_{R,RS}$ through calculation. In conclusion, except that PL is obtained by the terminal device by measuring the downlink reference signal, the other parameters in the foregoing power calculation formula are determined based on the configuration of the base station.

When a current GF configuration from the base station is determined, $P_0$, α, μ, M, and f in the foregoing formula remain unchanged. In this case, assuming that the terminal device moves in a direction in which the terminal device is away from the base station, until the transmit power of the terminal device that is obtained through calculation according to the foregoing formula at a moment reaches $P_{CMAX}$, that is, $P_{PUSCH}$=$P_{CMAX}$, a downlink path loss $PL_0$ in this case is:

$$PL_0 \frac{P_{CMAX} - P_0 - 10*lg(2^\mu * M) + \Delta + f}{\alpha} \quad (2)$$

Assuming that a transmit power of each subcarrier of the downlink reference signal is $P_{T,RS}$, a receive power (namely, an RSRP) of the downlink reference signal of the terminal device in this case is $P_{RO,RS}$ Details are as follows:

$$P_{RO,RS} = P_{T,RS} - PL_0 = P_{T,RS} - \frac{P_{CMAX} - P_0 - 10*lg(2^\mu * M) + \Delta + f}{\alpha} \quad (3)$$

In formula (2), all parameter information except $P_{CMAX}$ in the right formula is configured by the base station. For GF, the parameter information may be referred to as GF configuration information. Therefore, before calculating the first threshold, the terminal device needs to first receive the GF configuration information sent by the base station.

RSRP_thr may be $P_{RO,RS}$. Details are as follows:

$$RSRP\_thr = P_{RO,RS} \quad (4)$$

A physical meaning of Formula (4) is that in the current GF configuration, if RSRP<$P_{RO,RS}$, it means that the transmit power obtained by the terminal device through calculation according to Formula (1) is definitely $P_{CMAX}$. In other words, the transmit power of the terminal device has reached a maximum value in this case, but still cannot meet a transmit power requirement. Consequently, a probability of a transmission failure increases, and transmission reliability is reduced. Based on this, the terminal device does not perform GF transmission in this case. $P_{R,RS}$=$P_{RO,RS}$ is a critical case. Once the downlink RSRP is less than the critical value, the terminal device no longer performs GF transmission.

From a conservative perspective, RSRP_th may alternatively be $P_{RO,RS}$+delta_RSRP. Details are as follows:

$$RSRP\_thr = P_{RO,RS} + delta\_RSRP \quad (5)$$

Herein, delta_RSRP is a positive integer. A physical meaning of Formula (5) is that the terminal device no longer performs GF transmission starting from a moment at which a difference between the downlink RSRP and the critical value $P_{RO,RS}$, is delta_RSRP. This can effectively avoid unreliable uplink transmission caused by a sharp reduction in the channel quality due to shadow fading or the like.

When the channel quality is measured by using the downlink path loss, a path loss threshold, PL_thr, may be $PL_0$ in Formula (2) or $PL_0$+delta_RSRP.

It should be specially noted that that the first uplink data may be transmitted in the GF manner does not mean that the UE definitely needs to transmit the first uplink data in the GF manner, but means that the UE may determine, based on a requirement, whether to transmit the first uplink data in the GF manner or the GB manner. A specific manner may be determined at a MAC layer of the UE by using a decision algorithm. That the first uplink data cannot be transmitted in the GF manner means that before the channel quality is greater than the first threshold again, the UE can transmit the first uplink data only in the GB manner. Certainly, if the channel quality improves (greater than the first threshold) after a period of time, and the first uplink data fails to be transmitted in the GB manner in this period of time, the base station may still choose to transmit the first uplink data in the GF manner.

The data transmission method provided in this application is applicable to all communication services, and in particular, to a service that has a specific latency and reliability requirement. Because calculation overheads are required to calculate the first threshold, to reduce the calculation overheads, a compromise solution may be considered: The UE adds a service (for example, determined based on a QCI) that has a latency and reliability requirement to a whitelist; and if current to-be-transmitted data belongs to the service in the whitelist, the terminal device performs the foregoing solution for determining whether the GF manner is available; or if current to-be-transmitted data does not belong to the service in the whitelist, the terminal device does not perform the foregoing solution (that is, the terminal device can always perform GF transmission at any time without determining current channel quality).

This application provides a solution to a problem that ACK of a HARQ fails in a GF mechanism in a special scenario, to avoid a reduction in transmission reliability and an increase in a latency that are caused by the problem.

The foregoing describes in detail the method provided in this application, and the following describes an apparatus provided in this application.

Figure 7:
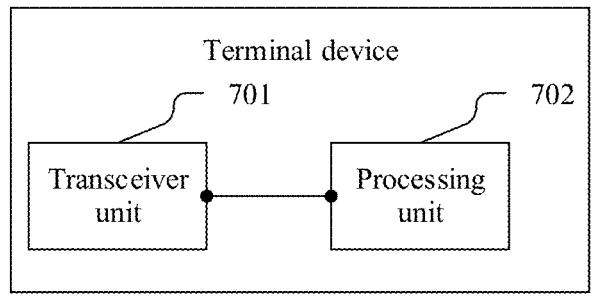
FIG. 7 is a possible schematic structural diagram of a terminal device according to this application.

This application first provides a terminal device. Referring to FIG. 7, the terminal device may include:

a transceiver unit 701 (which may be specifically one or more transceivers), configured to obtain a grant-free GF resource configured by a base station; and a processing unit 702 (which may be specifically one or more processors), configured to obtain current channel quality, where the transceiver unit 701 is further configured to: if the current channel quality is first channel quality, transmit to-be-transmitted data by using the GF resource, or transmit the to-be-transmitted data by using a GB resource, where the first channel quality falls within a first range; or the transceiver unit 701 is further configured to: if the current channel quality is second channel quality, skip transmitting to-be-transmitted data by using the GF resource, where the second channel quality falls within a second range; and the first channel quality is better than the second channel quality, and the first range is different from the second range.

In an implementation, in some possible implementations of this application, the transceiver unit 701 is further configured to:

before the transceiver unit 701 transmits the to-be-transmitted data by using the GB resource, receive the GB resource configured by the base station.

In an implementation, in some possible implementations of this application, a parameter related to the current channel quality includes:

at least one of a reference signal received power RSRP, reference signal received quality RSRQ, a reference signal carrier-to-interference-and-noise ratio RS-CINR, or a path loss PL of a channel.

In an implementation, in some possible implementations of this application, the first channel quality meets at least one of the following:

the RSRP is greater than a first threshold, the RSRQ is greater than a second threshold, the RS-CINR is greater than a third threshold, or the PL is less than a fourth threshold; and the second channel quality meets at least one of the following:

the RSRP is less than the first threshold, the RSRQ is less than the second threshold, the RS-CINR is less than the third threshold, or the PL is greater than the fourth threshold. In an implementation, in some possible implementations of this application:

if the parameter related to the current channel quality includes the RSRP, the first range includes that the RSRP is greater than the first threshold, and the second range includes that the RSRP is less than the first threshold; or if the parameter related to the current channel quality includes the RSRQ, the first range includes that the RSRQ is greater than the second threshold, and the second range includes that the RSRQ is less than the second threshold; or if the parameter related to the current channel quality includes the RS-CINR, the first range includes that the RS-CINR is greater than the third threshold, and the second range includes that the RS-CINR is less than the third threshold; or if the parameter related to the current channel quality includes the PL, the first range includes that the PL is less than the fourth threshold, and the second range includes that the PL is greater than the fourth threshold.

In an implementation, in some possible implementations of this application:

if the current channel quality includes the RSRP, an RSRP of the first channel quality is greater than the first threshold, and an RSRP of the second channel quality is less than the first threshold; or if the current channel quality includes the RSRQ, RSRQ of the first channel quality is greater than the second threshold, and RSRQ of the second channel quality is less than the second threshold; or if the current channel quality includes the RS-CINR, an RS-CINR of the first channel quality is greater than the third threshold, and an RS-CINR of the second channel quality is less than the third threshold; or if the current channel quality includes the PL, a PL of the first channel quality is less than the fourth threshold, and a PL of the second channel quality is greater than the fourth threshold.

In an implementation, in some possible implementations of this application:

the transceiver unit 701 is specifically configured to receive GF configuration information sent by the base station; and the processing unit 702 is further configured to perform calculation based on the GF configuration information, to determine the first range and the second range. In an implementation, that the processing unit 702 is further configured to perform calculation based on the GF configuration information, to determine the first range and the second range may be understood as that the processing unit 702 is further configured to perform calculation based on the GF configuration information, to determine one or more of the first threshold to the fourth threshold (after the one or more thresholds are determined, the first range and the second range are actually determined). It should be noted that in specific implementation of the determining the first range and the second range, only the one or more thresholds may be determined, and after the current channel quality is compared with the one or more thresholds, a relationship between the current channel quality and the threshold may be obtained, in other words, it is determined whether the current channel quality falls within the first range (the channel quality within the range may be referred to as the first channel quality) or the second range (the channel quality within the range may be referred to as the second channel quality).

In an implementation, in some possible implementations of this application, if the first range includes that the RSRP is greater than the first threshold, and the second range includes that the RSRP is less than the first threshold, the processing unit 702 is specifically configured to perform calculation according to a first preset formula based on a maximum transmit power, $P_{CMAX}$, of the terminal device, a reference transmit power, $P_{T,RS}$ of a downlink signal, and the GF configuration information, to obtain the first threshold.

In an optional implementation of this application, the first preset formula includes:

$$\text{RSRP\_thr} = P_{T,RS} - \frac{P_{CMAX} - P_O - 10*lg(2^\mu *M) - \Delta - f}{\alpha} - \text{delta\_RSRP},$$

where

RSRP_thr is the first threshold, $P_O$ is a receive power of the downlink signal, $\alpha$ is a path loss impact factor, $\mu$ is a subcarrier spacing indicator, M is an uplink transmission resource size, $\Delta$ is a preset parameter, f is a dynamic power control parameter, delta_RSRP is a preset parameter, and delta_RSRP>=0.

In an implementation, in some possible implementations of this application, the processing unit 702 is specifically configured to measure the downlink signal by using the transceiver unit, to obtain a value of the RSRP.

In an implementation, in some possible implementations of this application, if the parameter related to the channel quality includes the RSRQ, the processing unit 702 is specifically configured to:

measure the downlink signal by using the transceiver unit, to obtain the value of the RSRP;

detect a signal in receive bandwidth by using the transceiver unit, to obtain a value of a reference signal strength indicator RSSI; and perform calculation based on the value of the RSRP and the value of the RSSI according to a second preset formula, to obtain a value of the RSRQ, where the second preset formula includes: RSRQ=N*RSRP/RSSI, and N is a quantity of subcarriers in the receive bandwidth.

In an implementation, in some possible implementations of this application, if the parameter related to the channel quality includes the RS-CINR, the processing unit 702 is specifically configured to:

measure the downlink signal by using the transceiver unit, to obtain the value of the RSRP;

detect the signal in the receive bandwidth by using the transceiver unit, to obtain the value of the reference signal strength indicator RSSI; and perform calculation based on the RSRP and the RSSI according to a third preset formula, to obtain the value of the RSRQ, where the third preset formula includes: RS-CINR=N*RSRP/(RSSI−N*RSRP), and N is the quantity of subcarriers in the receive bandwidth.

In an implementation, in some possible implementations of this application, if the parameter related to the channel quality includes the PL, the processing unit 702 is specifically configured to:

obtain a value of the reference transmit signal power, $P_{T,RS}$ of the downlink signal; obtain a value of a receive power, $P_{R,RS}$ of the downlink signal; and perform calculation based on $P_{T,RS}$ and $P_{R,RS}$ according to a fourth preset formula, to obtain a value of the PL, where the fourth preset formula includes: $PL=P_{T,RS}-P_{R,RS}$.

In an implementation, in some possible implementations of this application, the transceiver unit 701 is further configured to: if the current channel quality is the second channel quality, transmit the to-be-transmitted data by using the grant-based GB resource.

In an optional implementation of this application:

the processing unit 702 is further configured to: before the terminal device obtains the current channel quality, obtain a service corresponding to the to-be-transmitted data; and the transceiver unit 702 is further configured to: if the processing unit 702 determines that the service is not in a preset list, transmit the to-be-transmitted data by using the GF resource; or the processing unit 702 is further configured to: if the processing unit 702 determines that the target service is in a preset list, perform the step of obtaining current channel quality.

Figure 8:
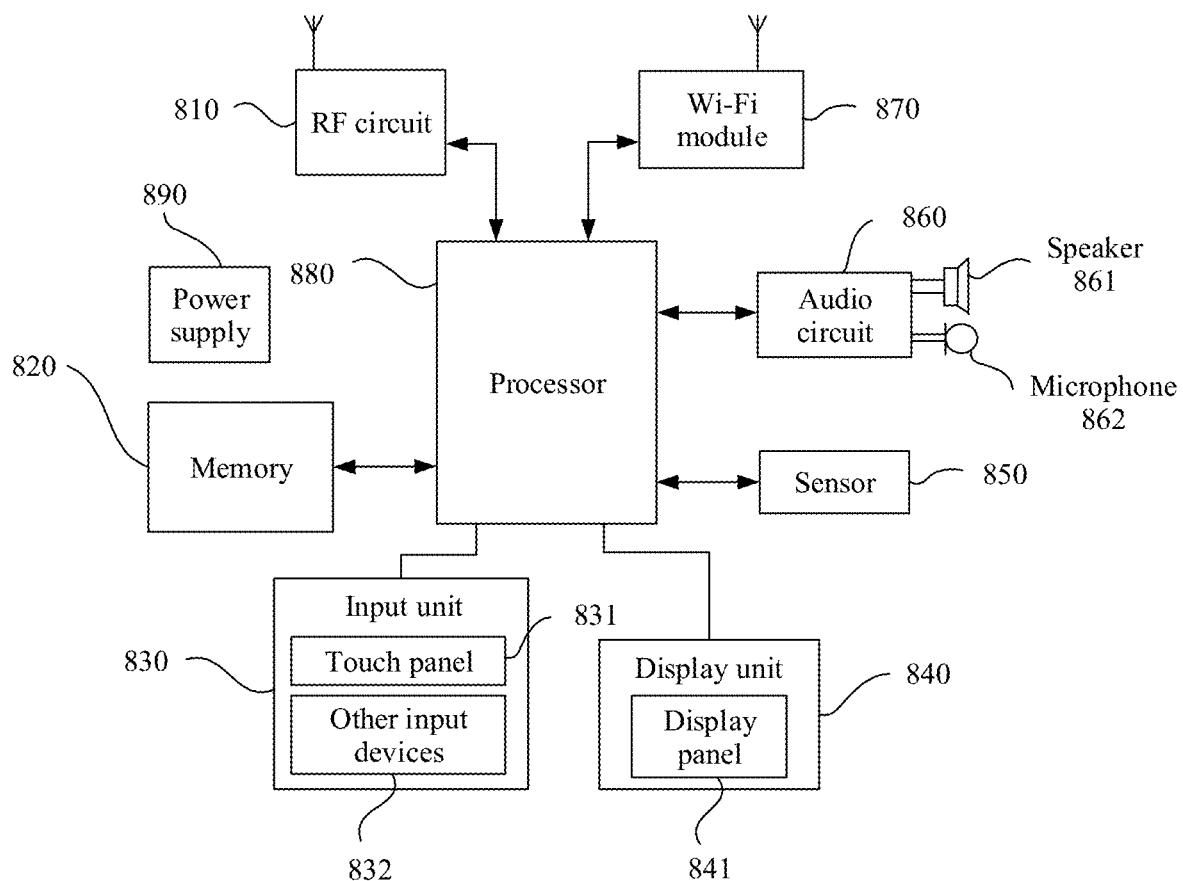
FIG. 8 is another possible schematic structural diagram of a terminal device according to this application.

As shown in FIG. 8, an embodiment of this application further provides another terminal device. For ease of description, only a part related to this embodiment of this application is described. For specific technical details that are not disclosed, refer to the method part in the embodiments of this application. The terminal device may be any terminal device including a mobile phone, a tablet computer, a PDA (personal digital assistant), a POS (point of sales), an in-vehicle computer, or the like. For example, the terminal device is the mobile phone.

FIG. 8 is a block diagram of a partial structure of a terminal device (for example, a mobile phone) that can perform any method embodiment of this application according to an embodiment of this application. Referring to FIG. 8, the mobile phone includes components such as a radio frequency (RF) circuit 810, a memory 820, an input unit 830, a display unit 840, a sensor 850, an audio circuit 860, a wireless fidelity (WiFi) module 870, a processor 880, and a power supply 890. A person skilled in the art may understand that the structure of the mobile phone shown in FIG. 8 does not constitute a limitation on the mobile phone, and the mobile phone may include more or fewer components than those shown in the figure, or combine some components, or have different component arrangements.

The following describes the constituent components of the mobile phone in detail with reference to FIG. 8.

The RF circuit 810 may be configured to: receive and send a signal in an information receiving/sending process or a call process. In particular, after receiving downlink information from a base station, the RF circuit 810 sends the downlink information to the processor 880 for processing. In addition, the RF circuit 810 sends designed uplink data to the base station. Usually, the RF circuit 810 includes but is not limited to an antenna, at least one amplifier, a transceiver, a coupler, a low noise amplifier (LNA), a duplexer, and the like. In addition, the RF circuit 810 may further communicate with a network and another device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 820 may be configured to store a software program and module. The processor 880 performs various function applications of the mobile phone and data processing by running the software program and the module that are stored in the memory 820. The memory 820 may mainly include a program storage area and a data storage area. The program storage area may store an operating system, an application program required by at least one function (such as a sound playback function or an image playback function), and the like. The data storage area may store data (such as audio data or a phone book) created based on use of the mobile phone, and the like. In addition, the memory 820 may include a high-speed random access memory, or may include a nonvolatile memory, such as at least one magnetic disk storage device, a flash memory device, or another volatile solid-state storage device.

The input unit 830 may be configured to: receive entered number or character information, and generate key signal input related to a user setting and function control of the mobile phone. Specifically, the input unit 830 may include a touch panel 831 and other input devices 832. The touch panel 831, also referred to as a touchscreen, may collect a touch operation (for example, an operation performed by a user on the touch panel 831 or near the touch panel 831 by using any proper object or accessory such as a finger or a stylus) performed by the user on or near the touch panel 831, and drive a corresponding connection apparatus based on a preset program. Optionally, the touch panel 831 may include two parts: a touch detection apparatus and a touch controller. The touch detection apparatus detects a touch orientation of the user, detects a signal generated by the touch operation, and transfers the signal to the touch controller. The touch controller receives touch information from the touch detection apparatus, converts the touch information into contact coordinates, and then sends the contact coordinates to the processor 880. The touch controller can receive and execute a command sent by the processor 880. In addition, the touch panel 831 may be implemented in a plurality of types such as a resistive type, a capacitive type, an infrared type, and a surface acoustic wave type. The input unit 830 may include the other input devices 832 in addition to the touch panel 831. Specifically, the other input devices 832 may include but are not limited to one or more of a physical keyboard, a function key (for example, a volume control key or an on/off key), a trackball, a mouse, a joystick, and the like.

The display unit 840 may be configured to display information entered by the user or information provided for the user, and various menus of the mobile phone. The display unit 840 may include a display panel 841. Optionally, the display panel 841 may be configured in a form of a liquid crystal display (LCD), an organic light-emitting diode (OLED), or the like. Further, the touch panel 831 may cover the display panel 841. After detecting the touch operation on or near the touch panel 831, the touch panel 831 transmits information about the touch operation to the processor 880 to determine a type of a touch event. Subsequently, the processor 880 provides corresponding visual output on the display panel 841 based on the type of the touch event. Although the touch panel 831 and the display panel 841 are used as two independent parts in FIG. 8 to implement input and input functions of the mobile phone, in some embodiments, the touch panel 831 and the display panel 841 may be integrated to implement the input and output functions of the mobile phone.

The mobile phone may further include at least one sensor 850, for example, a light sensor, a motion sensor, and another sensor. Specifically, the light sensor may include an ambient light sensor and a proximity sensor. The ambient light sensor may adjust luminance of the display panel 841 based on brightness of ambient light. The proximity sensor may turn off the display panel 841 and/or backlight when the mobile phone moves to an ear. As a type of the motion sensor, an accelerometer sensor may detect values of acceleration in all directions (usually on three axes), may detect a value and a direction of gravity when the mobile phone is still. The accelerometer sensor may be applied to an application for identifying a mobile phone posture (such as switching between a landscape mode and a portrait mode, a related game, or magnetometer posture calibration), a function related to vibration identification (such as a pedometer or a knock), or the like. Another sensor such as a gyroscope, a barometer, a hygrometer, a thermometer, or an infrared sensor may be further configured on the mobile phone. Details are not described further herein.

The audio circuit 860, a speaker 861, and a microphone 862 may provide an audio interface between the user and the mobile phone. The audio circuit 860 may convert received audio data into an electrical signal and then transmit the electrical signal to the speaker 861, and the speaker 861 converts the electrical signal into a sound signal for output. In addition, the microphone 862 converts a collected sound signal into an electrical signal. The audio circuit 860 receives the electrical signal, converts the electrical signal into audio data, and then outputs the audio data to the processor 880 for processing, to send, through the RF circuit 810, the audio data to, for example, another mobile phone, or outputs the audio data to the memory 820 for further processing.

Wi-Fi is a short-distance wireless transmission technology. The mobile phone may help, by using the Wi-Fi module 870, the user receive and send an email, browse a web page, access streaming media, and the like. The Wi-Fi module 870 provides wireless broadband internet access for the user. Although FIG. 8 shows the Wi-Fi module 870, it may be understood that the Wi-Fi module 870 is not a mandatory component of the mobile phone, and may be omitted based on a requirement without changing the essence of this application.

The processor 880 is a control center of the mobile phone, is connected to all parts of the entire mobile phone by using various interfaces and lines, and performs various functions of the mobile phone and data processing by running or executing the software program and/or the module that are/is stored in the memory 820 and invoking data stored in the memory 820, to perform overall monitoring on the mobile phone. Optionally, the processor 880 may include one or more processing units. Preferably, an application processor and a modem processor may be integrated into the processor 880. The application processor mainly processes an operating system, a user interface, an application program, and the like. The modem processor mainly processes wireless communication. It should be understood that the modem processor may not be integrated into the processor 880.

It should be understood that there may be one or more processors 880, and the more processors are two or more processors. This may be specifically adjusted based on an actual application, and is not limited herein. There may be one or more memories 820, and the more memories are two or more memories. This may be specifically adjusted based on an actual application, and is not limited herein.

The mobile phone further includes the power supply 890 (for example, a battery) supplying power to all parts. Preferably, the power supply may be logically connected to the processor 880 by using a power management system, to implement functions such as charging management, discharging management, and power consumption management by using the power management system.

Although not shown, the mobile phone may further include a camera, a Bluetooth module, and the like. Details are not described further herein.

In some embodiments, the processor 880 included in the terminal device may be configured to perform the steps performed by the terminal device in FIG. 2 to FIG. 6.

In addition, for example, a system that may be carried by the terminal device may include iOS®, Android®, Microsoft®, Linux®, another operating system, or the like. This is not limited in this embodiment of this application.

Figure 9:
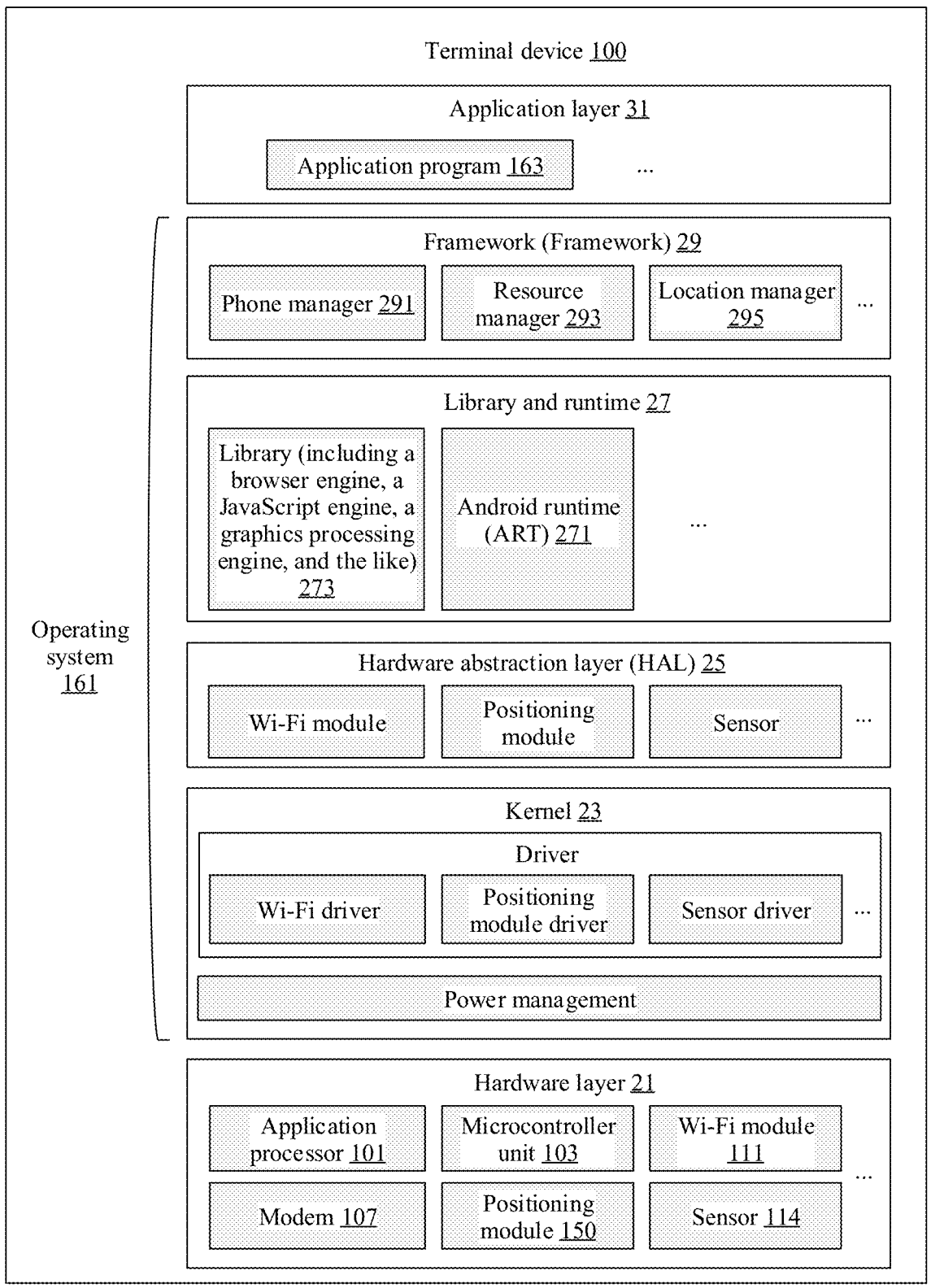
FIG. 9 is another possible schematic structural diagram of a terminal device according to this application.

A terminal device 100 carrying an Android® operating system is used as an example. As shown in FIG. 9, the terminal device 100 may be logically divided into a hardware layer 21, an operating system 161, and an application layer 31. The hardware layer 21 includes hardware resources such as an application processor 101, a microcontroller unit 103, a modem 107, a Wi-Fi module 111, a sensor 114, and a positioning module 150. The application layer 31 includes one or more application programs, for example, an application program 163. The application program 163 may be any type of application program such as a social application, an e-commerce application, or a browser. The operating system 161 is used as software middleware between the hardware layer 21 and the application layer 31, and is a computer program for managing and controlling hardware and software resources.

In an embodiment, the operating system 161 includes a kernel 23, a hardware abstraction layer (HAL) 25, library and runtime 27, and a framework 29. The kernel 23 is configured to provide an underlying system component and a service, for example, power management, memory management, thread management, or a hardware driver. The hardware driver includes a Wi-Fi driver, a sensor driver, a positioning module driver, or the like. The hardware abstraction layer 25 encapsulates a kernel driver, provides an interface for the framework 29, and shields implementation details of a lower layer. The hardware abstraction layer 25 runs in user space, and the kernel driver runs in kernel space.

The library and the runtime 27 are also referred to as a runtime library, and provide a required library file and an execution environment for an executable program during running. The library and the runtime 27 include an Android runtime (ART) 271, a library 273, and the like. The ART 271 is a virtual machine or virtual machine instance that can convert bytecode of an application program into machine code. The library 273 is a program library that provides support for the executable program during running, and includes a browser engine (for example, Webkit), a script execution engine (for example, a JavaScript engine), a graphics processing engine, and the like.

The framework 29 is configured to provide various basic common components and services, such as window management and location management, for an application program in the application layer 31. The framework 29 may include a phone manager 291, a resource manager 293, a location manager 295, and the like.

All functions of components in the operating system 161 described above may be implemented by the application processor 101 by executing the program stored in the memory 105.

A person skilled in the art may understand that the terminal device 100 may include fewer or more components than those shown in FIG. 9. The terminal device shown in FIG. 9 merely includes components more related to a plurality of implementations disclosed in the embodiments of this application.

This application further provides another terminal device. The terminal device includes:

one or more processors, one or more memories, and a transceiver.

The transceiver is configured to: receive and send data.

The memory is configured to store an instruction.

The one or more processors are configured to execute the instruction in the one or more memories, to perform the method in any one of the foregoing embodiments in FIG. 2 to FIG. 6.

In an implementation, the transceiver includes:

a transmitter and a receiver.

The receiver is configured to receive any downlink signal and the GF configuration information in any one of the foregoing embodiments in FIG. 2 to FIG. 6 that is sent by a network device.

The transmitter is configured to send any to-be-transmitted data, namely, uplink data, in any one of the foregoing embodiments in FIG. 2 to FIG. 6.

More specifically, an embodiment of this application further provides another terminal device. The terminal device has a function of implementing behavior of the terminal device in any one of the foregoing method embodiments. The function may be implemented by hardware, or may be implemented by hardware executing corresponding software. The hardware or the software includes one or more modules corresponding to sub-functions in the function. Optionally, the terminal device may be user equipment.

An embodiment of this application further provides a computer readable storage medium, and the computer readable storage medium stores a computer program. When the computer program is executed by a computer, a method procedure related to the terminal device in any one of the foregoing method embodiments is implemented. Specifically, the computer may be the foregoing terminal device.

An embodiment of this application further provides a computer program or a computer program product including the computer program. When the computer program is executed on a computer, the computer is enabled to implement a method procedure related to the terminal device in any one of the foregoing method embodiments. Specifically, the computer may be the foregoing terminal device.

An embodiment of this application further provides a chip, including a processing module and a communications interface. The processing module can perform a method procedure related to the terminal device in any one of the foregoing method embodiments. The chip may further include a storage module (for example, a memory). The storage module is configured to store an instruction, the processing module is configured to execute the instruction stored in the storage module, and the execution of the instruction stored in the storage module enables the processing module to perform a method procedure related to the terminal device in any one of the foregoing method embodiments.

Figure 10:
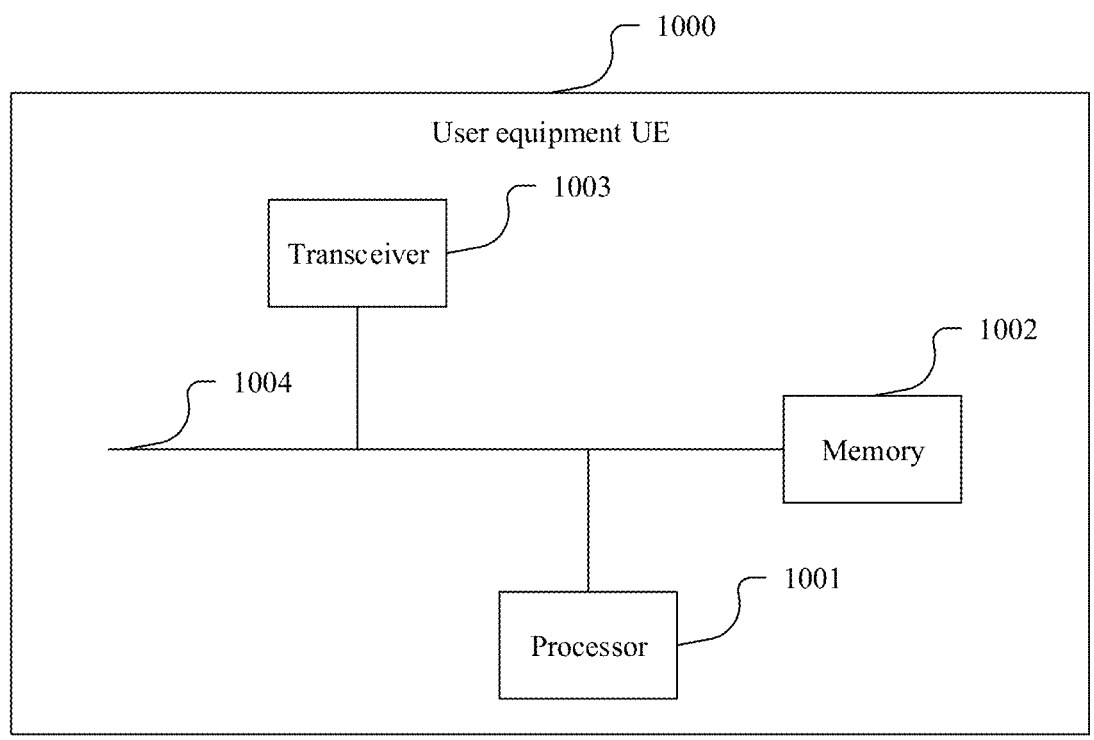
FIG. 10 is another possible schematic structural diagram of a terminal device according to this application.

The terminal device in this embodiment of this application may be UE 1000 shown in FIG. 10.

Referring to FIG. 10, the UE 1000 includes a processor 1001, a memory 1002, a transceiver 1003, and a bus 1004. The processor 1001, the memory 1002, and the transceiver 1003 are interconnected by using the bus 1004. The bus 1004 may be a PCI bus, an EISA bus, or the like. The bus 1004 may be classified into an address bus, a data bus, a control bus, and the like. For ease of representation, only one thick line is used to represent the bus 1004 in FIG. but this does not mean that there is only one bus or only one type of bus.

It should be understood that there may be one or more processors in this embodiment of this application. This may be specifically adjusted based on an actual application scenario. This is merely an example for description herein, and is not limited. There may be one or more memories in this embodiment of this application. This may be specifically adjusted based on an actual application scenario. This is merely an example for description herein, and is not limited.

An embodiment of this application further provides a nonvolatile storage medium. The nonvolatile storage medium stores one or more pieces of program code. When the processor 1001 in the UE 1000 executes the program code, the UE 1000 performs related method steps performed by the UE in any one of the method embodiments in FIG. 2 to FIG. 6 in this application.

For detailed descriptions of the modules in the UE 1000 provided in this embodiment of the present invention and technical effects brought after the modules perform the related method steps performed by the UE in any method embodiment of the present invention, refer to related descriptions in the method embodiments in FIG. 2 to FIG. 6 in this application. Details are not described herein again.

Figure 11:
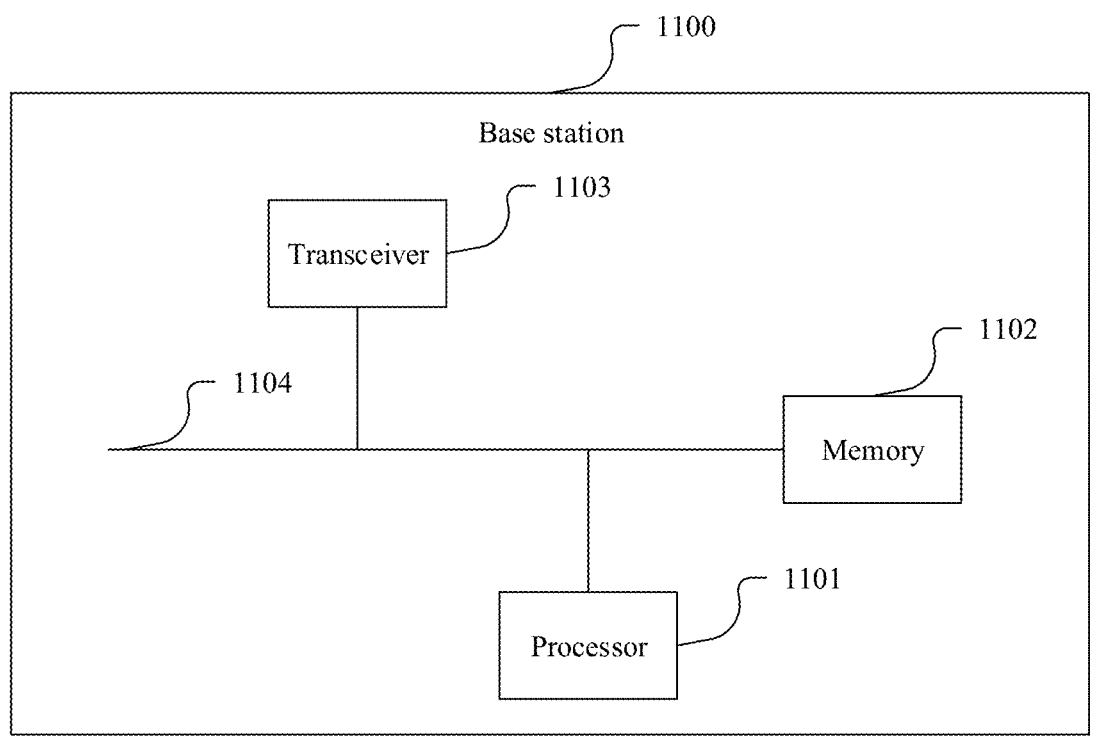
FIG. 11 is a possible schematic structural diagram of a base station corresponding to a terminal device according to this application.

In addition, in this embodiment of this application, a structure of the base station corresponding to the UE may be a base station 1100 shown in FIG. 11.

Referring to FIG. 11, the base station 1100 includes a processor 1101, a memory 1102, a transceiver 1103, and a bus 1104. The processor 1101, the memory 1102, and the transceiver 1103 are interconnected by using the bus 1104. The bus 1104 may be a peripheral component interconnect (PCI) bus, an extended industry standard architecture (EISA) bus, or the like. The bus 1104 may be classified into an address bus, a data bus, a control bus, and the like. For ease of representation, only one thick line is used to represent the bus 1104 in FIG. 11, but this does not mean that there is only one bus or only one type of bus.

It should be understood that there may be one or more processors or memories in this embodiment of this application. This may be specifically adjusted based on an actual application scenario. This is merely an example for description herein, and is not limited.

An embodiment of this application further provides a nonvolatile storage medium. The nonvolatile storage medium stores one or more pieces of program code. When the processor 1101 in the base station 1100 executes the program code, the base station 1100 performs related method steps performed by the base station in any one of the method embodiments in FIG. 2 to FIG. 6 in this application.

The base station 1100 provided in this embodiment of this application can perform the related method steps performed by the base station in any method embodiment of the present invention. For detailed descriptions of the modules or units in the base station 1100 and technical effects brought after the modules or units perform the related method steps performed by the base station in any method embodiment of the present invention, refer to related descriptions in the embodiments in FIG. 2 to FIG. 6 in this application. Details are not described herein again.

It should be understood that the processor mentioned in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. In an example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memory described in this specification is intended to include but is not limited to these memories and any memory of another proper type.

It should be further understood that first, second, and various numerical numbers in this specification are merely for differentiation for ease of description, but are not intended to limit the scope of this application.

It should be understood that sequence numbers of the foregoing processes do not mean execution sequences in various embodiments of this application. Some or all steps may be performed concurrently or in sequence. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing described system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the foregoing described apparatus embodiment is merely an example. For example, division into the units is merely logical function division, and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, a terminal device, or the like) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

For related parts between the method embodiments of this application, reference may be made to each other. The apparatus provided in each apparatus embodiment is configured to perform the method provided in the corresponding method embodiment. Therefore, each apparatus embodiment may be understood with reference to a related part in a related method embodiment.

Structural diagrams of the apparatuses provided in the apparatus embodiments of this application merely show simplified designs of the corresponding apparatuses. In actual application, the apparatus may include any quantity of transmitters, receivers, processors, memories, and the like, to implement functions or operations performed by the apparatuses in the apparatus embodiments of this application, and all apparatuses that can implement this application fall within the protection scope of this application.

Names of messages/frames/indication information, modules, units, or the like provided in the embodiments of this application are merely examples, and other names may be used provided that the messages/frames/indication information, modules, units, or the like have same functions.

The terms used in the embodiments of this application are merely for the purpose of illustrating specific embodiments, and are not intended to limit the present invention. The terms "a", "the", and "the" of singular forms used in the embodiments and the embodiments of this application are also intended to include plural forms, unless otherwise specified in the context clearly. It should be further understood that the term "and/or" used in this specification indicates and includes any or all possible combinations of one or more associated listed items. In addition, the character "/" in this specification usually indicates an "or" relationship between the associated objects.

Depending on the context, for example, the word "if" or "if" used herein may be explained as "when" or "when" or "in response to determining" or "in response to detection". Similarly, depending on the context, the phrase "if determining" or "if detecting (a stated condition or event)" may be explained as "when determining" or "in response to determining" or "when detecting (the stated condition or event)" or "in response to detection (the stated condition or event)".

A person of ordinary skill in the art may understand that all or some of the steps of the method in the foregoing embodiment may be implemented by a program instructing related hardware. The program may be stored in a readable storage medium in a device. When the program is executed, all or some of the steps are included. The storage medium includes a flash, an EEPROM, or the like.

In the foregoing specific implementations, the objective, technical solutions, and beneficial effects of the present invention are further described in detail. It should be understood that different embodiments can be combined. The foregoing descriptions are merely specific implementations of this application, but are not intended to limit the protection scope of the present invention. Any combination, modification, equivalent replacement, improvement, or the like made without departing from the spirit and principle of the present invention should fall within the protection scope of the present invention.

What is claimed is:

1. A data transmission method, comprising:
obtaining, by a terminal device, a grant-free (GF) resource configured by a base station;
obtaining, by the terminal device, a target service corresponding to to-be-transmitted data;
responsive to determining that the target service is not in a preset list, transmitting, by the terminal device, the to-be-transmitted data by using the GF resource, or
responsive to determining that the target service is in the preset list, obtaining, by the terminal device, a current channel quality;
comparing the current channel quality with a first preset range and a second preset range, wherein the first preset range is different from the second present range; and
responsive to determining that the current channel quality is a first channel quality that falls within the first preset range, transmitting, by the terminal device, the to-be-transmitted data by using the GF resource, or
responsive to determining that the current channel quality is a second channel quality that falls within the second preset range, transmitting, by the terminal device, the to-be-transmitted data by using a grant-based (GB) resource,
wherein the first channel quality is better than the second channel quality;
wherein a parameter related to the current channel quality comprises:
at least one of a reference signal received power (RSRP), reference signal received quality (RSRQ), a reference signal carrier-to-interference-and-noise ratio (RS-CINR), or a path loss (PL) of a channel corresponding to the current channel quality;
wherein:
the first channel quality meets at least one of the following: the RSRP is greater than a first threshold, the RSRQ is greater than a second threshold, the RS-CINR is greater than a third threshold, or the PL is less than a fourth threshold; and
the second channel quality meets at least one of the following: the RSRP is less than the first threshold, the RSRQ is less than the second threshold, the RS-CINR is less than the third threshold, or the PL is greater than the fourth threshold;
wherein the obtaining, by the terminal device, the GF resource configured by the base station comprises: receiving, by the terminal device, GF configuration information sent by the base station;
wherein the method further comprises:
performing, by the terminal device, a calculation based on the GF configuration information, to determine the first preset range and the second preset range; and
wherein the performing, by the terminal device, the calculation based on the GF configuration information, to determine the first preset range and the second preset range comprises:
performing, by the terminal device, a calculation according to a first preset formula based on a maximum transmit power, $P_{CMAX}$, of the terminal device, a reference transmit power, $P_{T,RS}$, of a downlink signal, and the GF configuration information, to obtain the first threshold.

2. The method according to claim 1, wherein before the transmitting, by the terminal device, the to-be-transmitted data by using the GB resource, the method further comprises:
receiving, by the terminal device, the GB resource configured by the base station.

3. The method according to claim 1, wherein:
responsive to determining that the parameter related to the current channel quality comprises the RSRP, the first preset range comprises that the RSRP is greater than the first threshold, and the second preset range comprises that the RSRP is less than the first threshold; or
responsive to determining that the parameter related to the current channel quality comprises the RSRQ, the first preset range comprises that the RSRQ is greater than the second threshold, and the second preset range comprises that the RSRQ is less than the second threshold; or responsive to determining that the parameter related to the current channel quality comprises the RS-CINR, the first preset range comprises that the RS-CINR is greater than the third threshold, and the second preset range comprises that the RS-CINR is less than the third threshold; or responsive to determining that the parameter related to the current channel quality comprises the PL, the first preset range comprises that the PL is less than the fourth threshold, and the second preset range comprises that the PL is greater than the fourth threshold.

4. The method according to claim 1, wherein:

responsive to determining that the parameter related to the current channel quality comprises the RSRP, an RSRP of the first channel quality is greater than the first threshold, and an RSRP of the second channel quality is less than the first threshold; or responsive to determining that the parameter related to the current channel quality comprises the RSRQ, RSRQ of the first channel quality is greater than the second threshold, and RSRQ of the second channel quality is less than the second threshold; or responsive to determining that the parameter related to the current channel quality comprises the RS-CINR, an RS-CINR of the first channel quality is greater than the third threshold, and an RS-CINR of the second channel quality is less than the third threshold; or responsive to determining that the parameter related to the current channel quality comprises the PL, a PL of the first channel quality is less than the fourth threshold, and a PL of the second channel quality is greater than the fourth threshold.

5. The method according to claim 1, wherein the first preset formula comprises:

$$\text{RSRP\_thr} = P_{T,RS} - \frac{P_{CMAX} - P_O - 10*lg(2^\mu * M) - \Delta - f}{\alpha} - \text{delta\_RSRP},$$

wherein

RSRP_thr is the first threshold, $P_O$ is a receive power of the downlink signal, $\alpha$ is a path loss impact factor, $\mu$ is a subcarrier spacing indicator, M is an uplink transmission resource size, $\Delta$ is a preset parameter, f is a dynamic power control parameter, delta_RSRP is a preset parameter and delta_RSRP>=0.

6. The method according to claim 1, wherein responsive to determining that the parameter related to the current channel quality comprises the RSRP, the obtaining, by the terminal device, the current channel quality comprises:

measuring, by the terminal device, a downlink signal to obtain a value of the RSRP.

7. The method according to claim 1, wherein responsive to determining that the parameter related to the current channel quality comprises the RSRQ, the obtaining, by the terminal device, the current channel quality comprises:

measuring, by the terminal device, a downlink signal to obtain a value of the RSRP;

detecting, by the terminal device, a signal in a receive bandwidth, to obtain a value of a reference signal strength indicator (RSSI); and performing, by the terminal device, a calculation based on the value of the RSRP and the value of the RSSI, according to a second preset formula, to obtain a value of the RSRQ, wherein the second preset formula comprises: RSRQ=N*RSRP/RSSI, and N is a quantity of subcarriers in the receive bandwidth.

8. The method according to claim 1, wherein responsive to determining that the parameter related to the current channel quality comprises the RS-CINR, the obtaining, by the terminal device, the current channel quality comprises:

measuring, by the terminal device, a downlink signal to obtain a value of the RSRP;

detecting, by the terminal device, a signal in a receive bandwidth, to obtain a value of a reference signal strength indicator (RSSI); and performing, by the terminal device, a calculation based on the value of the RSRP and the value of the RSSI, according to a third preset formula, to obtain a value of the RS-CINR, wherein the third preset formula comprises: RS-CINR=N*RSRP/(RSSI–N*RSRP) and N is a quantity of subcarriers in the receive bandwidth.

9. The method according to claim 1, wherein responsive to determining that the parameter related to the current channel quality comprises the PL, the obtaining, by the terminal device, the current channel quality comprises:

obtaining, by the terminal device, a value of a reference transmit signal power, $P_{T,RS}$, of a downlink signal;

obtaining, by the terminal device, a value of a receive power, $P_{R,RS}$, of the downlink signal; and performing, by the terminal device, a calculation based on $P_{T,RS}$ and $P_{R,RS}$, according to a fourth preset formula, to obtain a value of the PL, wherein the fourth preset formula comprises:

$$P_L = P_{T,RS} = P_{R,RS}.$$

10. A terminal device, comprising a memory and one or more processors, wherein:

the memory stores a computer program; and the one or more processors are configured to: invoke and execute the computer program stored in the memory, so that the terminal device performs the following:

obtaining a grant-free (GF) resource configured by a base station;

obtaining a target service corresponding to to-be-transmitted data;

responsive to determining that the target service is not in a preset list, transmitting the to-be-transmitted data by using the GF resource, or responsive to determining that the target service is in the preset list, obtaining a current channel quality;

comparing the current channel quality with a first preset range and a second preset range, wherein the first preset range is different from the second present range; and in response to the current channel quality being a first channel quality, transmitting the to-be-transmitted data by using the GF resource, or transmitting the to-be-transmitted data by using a grant-based (GB) resource, wherein the first channel quality falls within the first preset range, or in response to the current channel quality being a second channel quality, skipping transmitting the to-be-transmitted data by using the GF resource, wherein the second channel quality falls within the second preset range;

wherein the first channel quality is better than the second channel quality;

wherein a parameter related to the current channel quality comprises:

at least one of a reference signal received power (RSRP), reference signal received quality (RSRQ), a reference signal carrier-to-interference-and-noise ratio (RS-CINR), or a path loss (PL) of a channel corresponding to the current channel quality;

wherein:

the first channel quality meets at least one of the following: the RSRP is greater than a first threshold, the RSRQ is greater than a second threshold, the RS-CINR is greater than a third threshold, or the PL is less than a fourth threshold; and the second channel quality meets at least one of the following: the RSRP is less than the first threshold, the RSRQ is less than the second threshold, the RS-CINR is less than the third threshold, or the PL is greater than the fourth threshold;

wherein the obtaining, by the terminal device, the GF resource configured by the base station comprises: receiving, by the terminal device, GF configuration information sent by the base station;

wherein the method further comprises:

performing, by the terminal device, a calculation based on the GF configuration information, to determine the first preset range and the second preset range; and wherein the performing, by the terminal device, the calculation based on the GF configuration information, to determine the first preset range and the second preset range comprises:

performing, by the terminal device, a calculation according to a first preset formula based on a maximum transmit power, $P_{CMAX}$, of the terminal device, a reference transmit power, $P_{T,RS}$ of a downlink signal, and the GF configuration information, to obtain the first threshold.

11. The terminal device according to claim 10, wherein the-one or more processors are further configured to: invoke and execute the computer program stored in the memory, so that the terminal device performs the following:

receiving the GB resource configured by the base station.

12. A non-transitory computer readable storage medium, wherein the computer readable storage medium stores a computer readable instruction, and when a computer reads and executes the computer readable instruction, the computer is caused to perform the following:

obtaining a grant-free (GF) resource configured by a base station;

obtaining a target service corresponding to to-be-transmitted data;

responsive to determining that the target service is not in a preset list, transmitting the to-be-transmitted data by using the GF resource, or responsive to determining that the target service is in the preset list, obtaining a current channel quality;

comparing the current channel quality with a first preset range and a second preset range, wherein the first preset range is different from the second present range; and in response to the current channel quality being a first channel quality, transmitting the to-be-transmitted data by using the GF resource, or transmitting the to-be-transmitted data by using a grant-based (GB) resource, wherein the first channel quality falls within the first preset range, or in response to the current channel quality being a second channel quality, skipping transmitting the to-be-transmitted data by using the GF resource, wherein the second channel quality falls within the second preset range;

wherein the first channel quality is better than the second channel quality;

wherein a parameter related to the current channel quality comprises:

at least one of a reference signal received power (RSRP), reference signal received quality (RSRQ), a reference signal carrier-to-interference-and-noise ratio (RS-CINR), or a path loss (PL) of a channel corresponding to the current channel quality;

wherein:

the first channel quality meets at least one of the following: the RSRP is greater than a first threshold, the RSRQ is greater than a second threshold, the RS-CINR is greater than a third threshold, or the PL is less than a fourth threshold; and the second channel quality meets at least one of the following: the RSRP is less than the first threshold, the RSRQ is less than the second threshold, the RS-CINR is less than the third threshold, or the PL is greater than the fourth threshold;

wherein the obtaining, by the terminal device, the GF resource configured by the base station comprises: receiving, by the terminal device, GF configuration information sent by the base station;

wherein the method further comprises:

performing, by the terminal device, a calculation based on the GF configuration information, to determine the first preset range and the second preset range; and wherein the performing, by the terminal device, the calculation based on the GF configuration information, to determine the first preset range and the second preset range comprises:

performing, by the terminal device, a calculation according to a first preset formula based on a maximum transmit power, $P_{CMAX}$, of the terminal device, a reference transmit power, $P_{T,RS}$ of a downlink signal, and the GF configuration information, to obtain the first threshold.

* * * * *

UNITED STATES PATENT AND TRADEMARK OFFICE
CERTIFICATE OF CORRECTION

PATENT NO. : 11,930,523 B2
APPLICATION NO. : 17/286386
DATED : March 12, 2024
INVENTOR(S) : Han et al.

Page 1 of 1

It is certified that error appears in the above-identified patent and that said Letters Patent is hereby corrected as shown below:

In the Claims

Claim 9: Column 50, Line 36: "$P_L = P_{T,RS} = P_{R,RS}$." should read -- $P_L = P_{T,RS} - P_{R,RS}$. --.

Signed and Sealed this
Eighteenth Day of June, 2024

Katherine Kelly Vidal
*Director of the United States Patent and Trademark Office*